US011783651B2

(12) United States Patent
Balák et al.

(10) Patent No.: US 11,783,651 B2
(45) Date of Patent: Oct. 10, 2023

(54) METHOD AND SYSTEM FOR ACCESS CONTROL USING SHORT-RANGE WIRELESS COMMUNICATIONS

(71) Applicant: Axis AB, Lund (SE)

(72) Inventors: Zdeněk Balák, Prague (CZ); David Němec, Prague (CZ)

(73) Assignee: AXIS AB, Lund (SE)

( * ) Notice: Subject to any disclaimer, the term of this patent is extended or adjusted under 35 U.S.C. 154(b) by 14 days.

(21) Appl. No.: 17/540,266

(22) Filed: Dec. 2, 2021

(65) Prior Publication Data
US 2022/0198852 A1 Jun. 23, 2022

(30) Foreign Application Priority Data

Dec. 22, 2020 (EP) .................................... 20216506

(51) Int. Cl.
*G07C 9/00* (2020.01)
*H04B 17/318* (2015.01)
*G07C 9/20* (2020.01)
*G01S 11/06* (2006.01)
*H04W 4/02* (2018.01)

(52) U.S. Cl.
CPC .......... *G07C 9/00309* (2013.01); *G01S 11/06* (2013.01); *G07C 9/20* (2020.01); *H04B 17/318* (2015.01); *H04W 4/027* (2013.01); *G07C 2009/00317* (2013.01); *G07C 2009/00793* (2013.01)

(58) Field of Classification Search
CPC ....... G07C 9/00309; G07C 9/20; G01S 11/06; H04B 17/318; H04W 4/027; H04W 4/02; H04L 67/18; G06F 3/0412; G08C 17/02; B60R 2325/101
See application file for complete search history.

(56) References Cited

U.S. PATENT DOCUMENTS

| 2019/0037034 | A1* | 1/2019 | Lee ........................ H04L 67/52 |
| 2019/0313252 | A1 | 10/2019 | Ting et al. |
| 2020/0349781 | A1 | 11/2020 | Warrier et al. |
| 2022/0130234 | A1* | 4/2022 | Ly-Gagnon ........... H04L 67/125 |

FOREIGN PATENT DOCUMENTS

| EP | 3477600 A1 | 5/2019 |
| KR | 10-2016-0123264 A | 10/2016 |
| WO | 2015/023737 A1 | 2/2015 |
| WO | 2017/180381 A1 | 10/2017 |

* cited by examiner

*Primary Examiner* — Vernal U Brown
(74) *Attorney, Agent, or Firm* — XSENSUS LLP

(57) ABSTRACT

A method in an access control system comprising a control unit connected to one or more mobile devices using radio-frequency signal communication. The control unit sends a motion status request to a connected mobile device out of the one or more connected mobile devices in response to the generated event. The method comprises determining an indication of a probability that the connected mobile device is associated with the event. Determining the indication is based on received signal strength data, measured by the connected mobile device on the radio-frequency signals transmitted by the control unit during a first predetermined period of time before the motion status request is received, and motion sensor data collected from a motion sensor comprised in the connected mobile device during a second predetermined period of time before the motion status request is received.

15 Claims, 9 Drawing Sheets

METHOD AND SYSTEM FOR ACCESS CONTROL USING SHORT-RANGE WIRELESS COMMUNICATIONS

CROSS-REFERENCE TO RELATED APPLICATION

This application claims priority to European Patent Application No. 20216506.4 filed on Dec. 22, 2020, the entire disclosure of which is incorporated by reference herein.

TECHNICAL FIELD

Embodiments herein relate to a method and system for access control using short-range wireless communications. In particular, they relate to determining whether or not to arrange to carry out an action in response to a request in an access control system comprising an access control unit and one or more mobile devices.

BACKGROUND

A system using short-range wireless communications for access control usually comprises a control unit and a mobile device. The short-range wireless communication between the mobile device and the control unit may e.g. be performed via Bluetooth, Bluetooth Low Energy (BLE), Zigbee, Wifi, Radio-frequency identification (RFID), etc. A current solution of access control in, e.g. a door-station, using Bluetooth wireless communications is a one-to-one solution where a secure Bluetooth connection between the control unit and the mobile device is setup after the mobile device user has pressed a button on the door-station or on the mobile device. The connection time is then up to 10 s, which makes the opening process far longer than opening the door with an RFID badge and reader.

There are also other products using Bluetooth access control solution with a one-to-one secure connection, where for example, a mobile device connects automatically when in reach of a hello message sent out from a door station. As an additional password to a door opening command, the user moves the mobile device in a predetermined pattern sensed by a motion sensor in the mobile device. When the movement pattern is correct, the mobile device sends an ok to the door station that opens the door.

EP3477600A1 discloses a method for controlling access in a system comprising a portable device associated with a user and an access control device. The portable device and the access control device are configured to wirelessly communicate with each other. The method compares received signal strength over time with a previously determined reference signal strength profile. By determining the signal strengths over time and by comparing them with the determined reference signal strength profile, it is possible to differentiate between a first situation where a user is approaching his office door with the intention to enter into the office space and a second situation where the user is approaching his office door with the intention to go past it in the corridor. The method also compares motion sensor data with a reference value. A movement pattern of the portable device is used to obtain a more accurate timing for controlling the access control device to avoid or at least reduce undesirable delay or waiting time for the user.

WO2015/023737 discloses a wireless access control system including a remote access device and an electronic lock. The electronic lock communicates with the remote access device. The electronic lock controls the ability to lock and unlock a door in which the electronic lock is disposed. The electronic lock determines when the remote access device is at a distance less than or equal to a predetermined distance from the lock to enable the lock to be unlocked. In one of the embodiments, in order to determine that a remote access device is actually in position to access a lock, the wireless access control system determines the radio signal strength of an access request from the remote access device. The controller at the remote access device determines whether the radio signal strength is greater than a predetermined value. If yes, then a signal is sent from the wireless access control system to the remote access device. The remote access device determines the radio signal strength of the signal from the wireless access control system and permission to control the lock is only granted if the remote access device determines that the remote signal strength of the signal from the wireless access system is above a predetermined threshold.

However, there are problems related to multiple users of an access control system. For example, there may be more mobile devices that try to connect to the control unit than the control unit can handle.

Moreover, the present solutions for access control either have limited security features or relatively slow response. For examples, some solutions use Received Signal Strength Indicator (RSSI) threshold value to determine the proximity to an access unit and then give access to anyone who is in the close proximity. Some solutions omit RSSI monitoring at all and just give access to anyone who press a button of an access application (app) in the mobile device.

SUMMARY

Considering the above it is an object of embodiments herein to provide an improved method and system for access control with regarding to multiple users, security and response time.

According to one aspect of embodiments herein, the object is achieved by a method performed in an access control system. The access control system may be a system controlling access to physical or logical areas or resources. The method is for determining whether or not to arrange to carry out an action in response to an event generated in the access control system. The access control system comprises a control unit connected to one or more mobile devices using radio-frequency signal communication. A respective access application is installed on the one or more mobile devices. The access application communicates with the control unit and may perform or arrange for the mobile device to perform actions in response to the communication with the control unit. For example, the access application may perform, or arrange for the mobile device to perform, some of the below actions.

The event indicates a request for the control unit to arrange to carry out the action. The control unit controls the access to the physical area or logical areas or resources in response to the generated event.

In some embodiments the action to be carried out is to give access to a physical resource, such as opening any type of lock, e.g. locking a door, a lid, a window or the like. In some other embodiments the action is to give access to a logical resource, such as a database, the content of a logical area or a protected device.

The request for the action to be carried out may be given by a user of a mobile device located close by the control unit. The request may for instance be given by pressing a button or touching a touch screen on or at the control unit, by engaging an IR detector located on or at the control unit, or by making a noise detected by a microphone on or at the control unit. The request may be given anonymously. The request may be a command to get access to the physical area, to the content of the logical area, to the protected device or to the protected resource controlled by the control unit.

The request may be given both by a user who is authorized to instigate the action but also by someone who is not. Having a mobile phone that is connected to the control unit may in itself mean that the user is authorized to instigate the action, or having a mobile phone that is connected may be only a first level of authorization leading to that a check of a second level of authorization (allowed to instigate the action or not) is started.

The user of the mobile device may be the person or the object carrying the device. The user of the mobile device may have an access right related to the resource controlled by the control unit. The user of the mobile device may be positioned physically close to the mobile unit when the method is carried out.

The access control system further comprises a radio-frequency transceiver. The method comprises transmitting, by the radio-frequency transceiver, radio-frequency signals to be used for measurements of received signal strength by the one or more connected mobile devices.

In response to the generated event, the control unit sends, a motion status request to a connected mobile device out of the one or more connected mobile devices.

The method further comprises determining an indication of a probability that the connected mobile device is associated with the event. Determining the indication of the probability is based on received signal strength data and motion sensor data of the connected mobile device. The received signal strength data is measured by the connected mobile device on the radio-frequency signals transmitted during a first predetermined period of time before the motion status request from the control unit is received. The received signal strength may be an indication of the signal energy level or the signal power level received at the receiver of the mobile device. Examples of measures of the received signal strength to be used may be received signal strength indicator, RSSI, or received channel power indicator, RCPI.

The motion sensor data is collected from a motion sensor, comprised in the connected mobile device, during a second predetermined period of time before the motion status request from the control unit is received. The motion sensor may for instance be an sensor measuring linear acceleration in up to three axis, such as an accelerometer, a sensor measuring rotation, such as a gyroscope, a sensor measuring air pressure, such as a barometer or a sensor measuring direction, such as a compass.

The control unit further determines whether or not to arrange to carry out the action based on the indication of the probability that the connected mobile device is associated with the event.

According to a further aspect of embodiments herein, the object is achieved by an access control system configured to perform the above method. The access control system comprises a control unit and one or more mobile devices. The mobile device may be any one of a mobile phone, a tablet, a laptop, a key fob, a smart watch or a smart bracelet. The control unit may be any unit controlling access to a physical area, a logical area, a protected device, or a protected resource.

In other words, according to embodiments herein, one or more mobile devices are connected to the control unit. The one or more mobile devices may for example be automatically connected to the control unit when in reach of the control unit. In some embodiments herein, when a mobile device has been connected to the control unit, a secure communication channel have been established between the mobile device and the control unit. Further, the connection of the mobile device may mean that the mobile device has been pre-authorized, i.e. the user of the mobile device is authorized, to instigate an action and the user of the mobile device is an authorized user of the service by the control unit. The authorization leads to that the control unit arranges to carry out the request that the mobile user requests. However, automatic connection may purely setup a communication channel, while all security requests, authorizations and encryptions, may be handled later on when requested.

A request for an action to be carried out, e.g. a door opening command, may for instance be given by pressing a button or touching a touch screen on or at the control unit. Further, a request may be given both by a user who is authorized to instigate the action, but also by someone who is not authorized to instigate the action, e.g. a user of an uncertified or not pre-authorized, and not paired or bonded mobile device, or even a user without a mobile device or a user with a mobile device but without an access application. A request may also be given by a user of a paired, but not connected mobile device, which may happen when the maximum number of connections to the control unit has been reached. When the control unit registers an event, or obtains an indication of an event which is a result of a request given by someone, a verification process is performed in order to determine if one of the connected mobile devices is associated with the event, or in other words if it was a user of one of the connected mobile devices who gave the corresponding request, and in order to decide if the requested action, e.g. to open the door, should be arranged or not. The control unit starts this verification process by sending a motion status request to the one or more connected mobile devices. To estimate a probability that that the connected mobile device is associated with the event, or in other words that a user of the connected mobile device is the user that generated the request, a corrected estimated value may be calculated for each of the one or more connected mobile devices based on received signal strength and motion sensor data. An action is then determined based on an indication of the probability that that the connected mobile device is associated with the event. The action may be to carry out the requested action, e.g. to open the door, if the indication of the probability of a connected mobile device indicates that it is the user of this connected mobile device who has given the request, with the intention to open the door. The action may also be not to carry out the requested action, i.e. not open the door, if the indications of the probability of all the connected devices indicate that none of the users of the connected devices have given the request. In addition, the control unit may also determine to release at least one connection between a mobile device and the control unit to enable other paired or bonded mobile devices to connect to the control unit, since the request may be given by a user of a paired but not connected mobile device. By releasing at least one connection, this paired mobile device can connect to the control unit and allow the user of this mobile device to instigate the action by requesting it.

An advantage of embodiments herein is that the requested activity may be instigated quickly and securely without the requester needing a separate access control device, such as an RFID card. Another benefit is that there is no need for the user of the mobile device to interact with the mobile device, such that it may remain in a pocket of the user. A benefit of automatically connecting each paired mobile device when in reach of the control unit, is that the connection is already set up once a user of a mobile device gives a request, e.g. a door opening command, and there is no delay in opening the door. In other words, as the connected mobile devices are already connected the control unit may react on the request quickly, by e.g. carrying out the requested action. For example, if the request is given by a user from a paired mobile device already connected to the control unit, e.g. by pressing a button or touching screen on a mobile device, the request is sent to the control unit and the control unit arranges the requested action, e.g. opens the door, without any further analysis, since the control unit knows that the request came from a paired an thereby pre-authorized mobile device. However, if the request is given on the control unit, e.g. by pressing a button or touching a touch screen on or at the control unit, the control unit must be able to determine if the request was given by a user of a connected mobile device, i.e. by a user having a mobile device that is connected to the control unit or not. Several mobile devices may be connected to the control unit at the same time. Some of them may belong to users who have not given the request on the control unit and who have no wish to get access for instance to the door controlled by the control unit. By sending a motion status request and then determining whether or not to arrange to carry out the action in response to the event based on the indication of the probability that the connected mobile device is associated with the event, the control unit can verify if the request is given by a user of a connected mobile device with the intention to open the door. In this way, the requested action can be arranged in a secured way. Moreover, using the motion data to improve the evaluation of the RSSI data, gives an additional security, so that the control unit does not determine to carry out the action for a user who is not associated with the event, for instance for a user who has left the mobile device on a table or in a bag but still close to the control unit.

The embodiments herein monitor behaviors of the users of connected mobile devices and arrange access for those who actually have intention and the right to the access. The embodiments herein also prevent the control unit from carrying out a requested action by someone un-authorized, or by an authorized user of a mobile device that is laying close to the control unit with an active connection, but where its user has not requested the action, or by an authorised user of a mobile device, who is passing by and not approaching the door at the time that the request is given to the control unit by another person.

The embodiments herein also allow to monitor many mobile devices at once and prioritizing them, e.g. by disconnecting selected connections. By disconnecting selected connections, such as connections to inactive or just passing mobile devices, incoming users may get connected faster.

Thus, the embodiments herein provide an improved method and system for access control with regarding to multiple users, security and response time.

BRIEF DESCRIPTION OF THE DRAWINGS

Examples of embodiments will be described in more detail with reference to attached drawings in which.

DETAILED DESCRIPTION

Figure 1A:
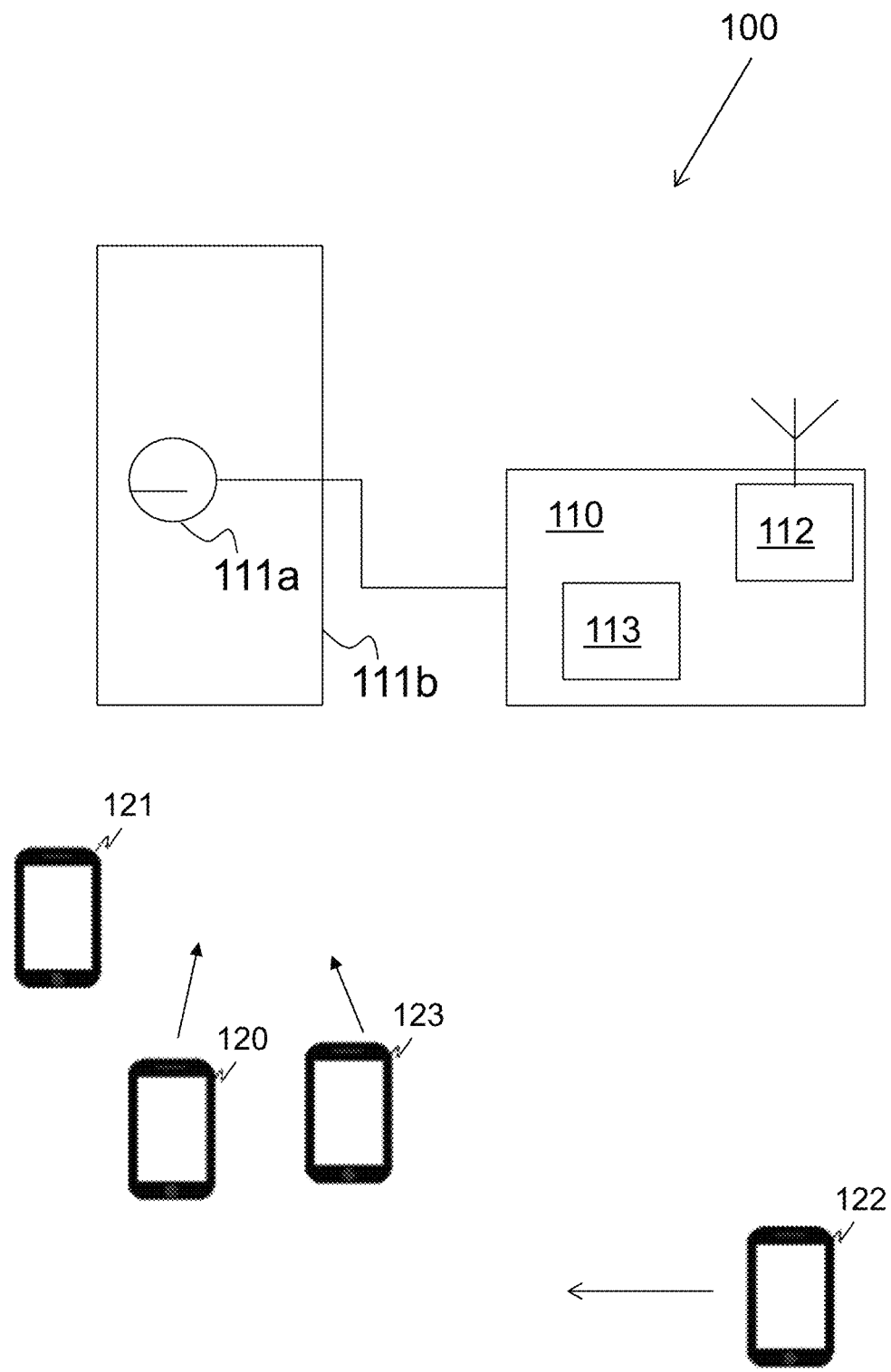
FIG. 1a is block diagram illustrating an access control system in which embodiments herein may be implemented.
Figure 1B:
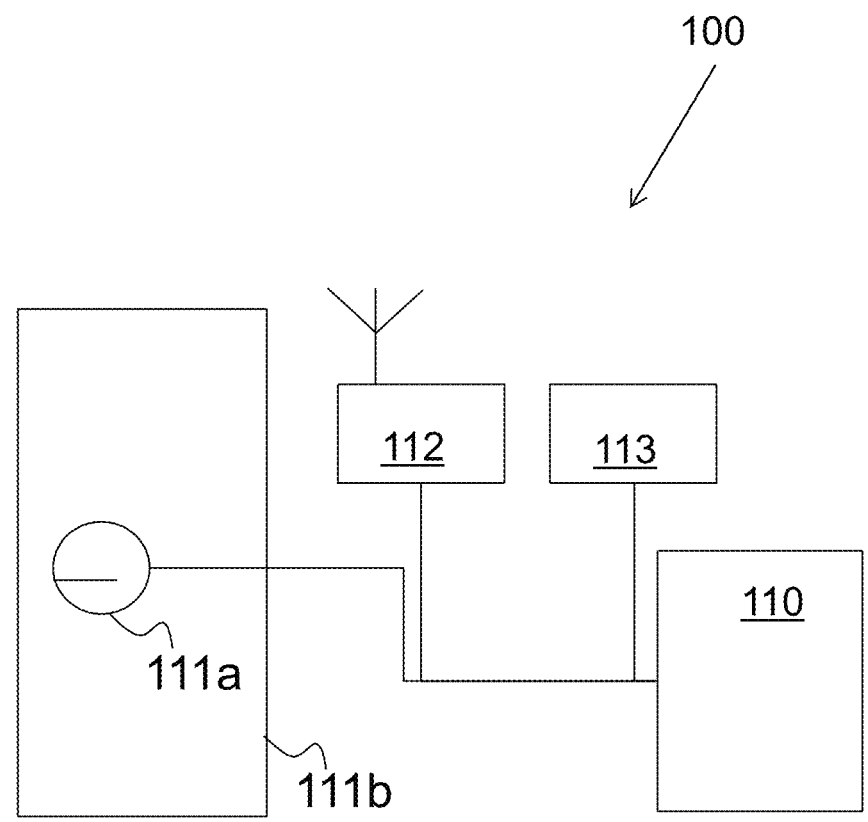
FIG. 1b is block diagram illustrating a further access control system in which embodiments herein may be implemented.
Figure 1B:
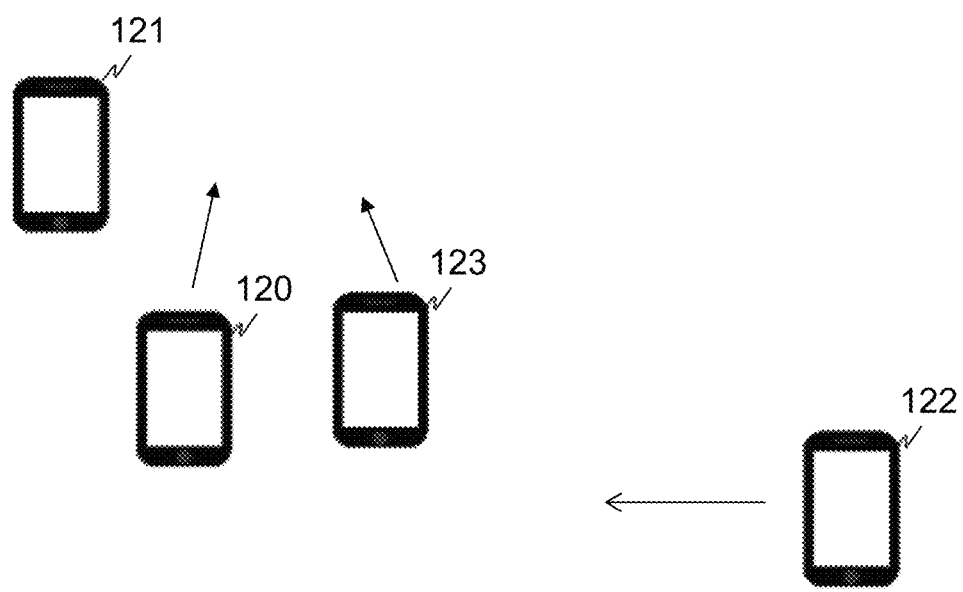

FIGS. 1a and 1b are block diagrams illustrating two embodiments of an access control system 100 in which embodiments herein for determining whether or not to arrange to carry out an action in response to an event generated in the access control system may be implemented.

As shown in both FIG. 1a and FIG. 1b, the access control system 100 comprises a control unit 110 which is exemplified as a door station for controlling access to a physical area, e.g. opening/unlocking or keeping any type of lock, e.g. a lock 111a of a door 111b, a lid, a window or the like, closed and/or locked in response to a generated event.

However, the control unit 110 may be any unit for controlling access to a logical area, a logical resource, such as a database, a protected device or a protected resource in response to the event. The control unit 110 may for example give or deny access to a database or content of a logical area, to a protected device or to a protected resource. For controlling access to a physical area, the control unit 110 may for instance be an intelligent door station, a simple keypad, a card-reader or a command-receiver-by-the-door connected to a remotely located intelligent access control device. The control unit 110 has wireless short-range communication functionality for communicating with one or more mobile devices using radio-frequency signal communication and may comprise a radio-frequency transceiver 112 as shown in FIG. 1a. The control unit 110 may further comprise a request receiving unit 113, e.g. a button to press, a touch screen, an IR detector, or a microphone as also shown in FIG. 1a. The control unit 110 may further comprise an activating module which may arrange to carry out a requested action, and a memory and a processor, which are not shown in FIG. 1a, nor FIG. 1b. Furthermore, means for processing and storage which are external to the control unit 110 may also be used by the access control system 100. For example, a cloud service or webserver may perform some of the actions below which are described as performed by the control unit 110.

In embodiments illustrated in FIG. 1b, the radio-frequency transceiver 112 and the request receiving unit 113 are external to the control unit 110 and connected to the control unit 110. The radio-frequency transceiver 112 and the request receiving unit 113 should in any case be close to each other in order to carry out embodiments described herein since measurements of received signal strength of signals transmitted from the radio-frequency transceiver 112 are used to determine whether or not a mobile device is associated with an event generated by the request receiving unit 113. Close to each other may for example mean that the distance between these two units should not be greater than a resolution, or an average positioning error, of the measurements of the received signal strength. Such average positioning errors may e.g. be in the order of one to five meters for state-of-the-art BLE solutions. Further, when the radio-frequency transceiver 112 is external to the control unit 110, it is preferably located close to the control unit 110.

The control unit 110 may further be connected, e.g. wirelessly or by wire, to the door 111b, or as illustrated in FIGS. 1a and 1b to the lock 111a of the door 111b. The control unit 110, the radio-frequency transceiver 112 and the request receiving unit 113 may each be arranged close to an object, such as the lock 111a of the door 111b, that is controlled by the access control system 100.

The access control system 100 further comprises one or more connected mobile devices 120-122 illustrated in FIGS. 1a and 1b and/or a respective access application installed on the one or more connected mobile devices 120-122. The respective access application may communicate with the control unit 110 and may perform or arrange for the respective one or more connected mobile device 120-122 to perform actions in response to the communication with the control unit 110. For example, the access application may perform, or arrange for the respective one or more connected mobile device 120-122 to perform, some of the below actions. Furthermore, means for processing and storage which are external to the respective one or more connected mobile device 120-122 may also be used by the respective one or more connected mobile device 120-122 and/or by the respective access application. For example, a cloud service or webserver may perform some of the actions below which are described as performed by the respective one or more connected mobile device 120-122. For example, the respective access application may arrange for the cloud service or webserver to perform the below actions.

In addition to the connected mobile devices 120-122 FIGS. 1a and 1b also shows an unconnected mobile device 123 which is in the vicinity of the access control system 100. FIGS. 1a and 1b further illustrates a respective arrow pointing away from some of the connected mobile device 120-122, and from the unconnected mobile device 123. The respective arrow illustrates a direction of motion of the respective mobile device 120-123. One of the mobile devices is not associated with an arrow, which means that this mobile device is stationary, i.e. its velocity is zero. Each of the connected mobile devices 120-122 may be e.g. a mobile phone, a laptop, a tablet, a key fob, a smart watch, or a smart bracelet. A user of a mobile device may request access to the physical area, to the content of the logical area, to the protected device or to the protected resource. Each connected mobile device 120-122 also has wireless short-range communication functionality and may comprise a radio-frequency transceiver for communicating with the control unit 110 using radio-frequency signal communication, a memory and a processor. Each of the connected mobile devices 120-122 is associated with a user.

The short-range wireless communication between the respective mobile device 120-122 and the control unit 110 may e.g. be performed via Bluetooth, BLE, Zigbee, Wifi, RFID, Ultra WideBand (UWB), FeliCa, ANT+, Z-Wave, or via infrared communication or ultrasound communication.

Mobile devices, such as the connected mobile devices 120-122, may be automatically connected to the control unit 110 when in reach of the control unit 110. Some examples of when a mobile device is in reach of the control unit 110 is when the mobile device detects or receives a Hello message sent by the control unit 110 using Bluetooth; or when the distance between the respective mobile device and the control unit 110 is shorter than a threshold distance, e.g. 1 m, which could be measured using a location service, Global Positioning System (GPS) or indoor position system. Distance measuring may also be achieved by analysis of characteristics of the radio communication e.g., via Time of Flight, or some other method combining such analysis with phase difference. Such distance measuring could for example be implemented with UWB. Motion sensor data of a mobile device may also be used to determine when the respective mobile device connects automatically to the control unit 110. For example, if a first mobile device 120 is still, or its motion sensor data is below a threshold, or if it is moving away from the control unit 110 etc., then it does not automatically connect to the control unit 110 according to some embodiments.

In embodiments herein several mobile devices may be connected simultaneously, as this makes the reaction to the event generation quicker. However, a pre-pairing step is optional. One way of solving the connection step is a pairing process, which may be described as a setup arrangement to achieve authorization to allow automatic connection. This pairing is not necessarily an authorization for any further action.

Another way of solving the connection step is to carry out the connection authorization each time a mobile device is close enough to the control unit 110, but still before the user of the mobile device generates the event by the request.

As mentioned above, when automatically connected to the control unit 110, the respective connected mobile device 120-122 may be bonded or paired to the control unit 110 by a pairing process. When two devices pair up, they may share their addresses, names, and profiles, and usually store them in memory. They may also share a common secret key, which allows them to bond or pair whenever they're together in the future.

Pairing usually requires an authentication process where a user must validate the connection between devices. The flow of the authentication process varies and usually depends on the interface capabilities of one device or the other.

The following is an example of pairing process for a door station:

The door station sends encryption keys and authorization identity (ID) to a mobile device;

The user launches a mobile access app in the mobile device and enters pairing mode;

In the pairing mode, the mobile app scans for door stations that can be paired;

The user selects correct door station and enters pairing PIN code. Pairing PINs are generated by the door station and must be somehow provided to the user. Any known paring method is applicable for the selected RF communication method.

Encryption keys and authorization ID are exchanged after the door station validates the pairing PIN. It is the authorization ID of the mobile device that contains the access right, e.g. to open the door.

After this pairing process, the mobile device is bonded or paired to the door station. The mobile device may start with the following pre-authorization process when in reach of the door station:

Connecting to the door station;

Establishing a secure communication channel with the door station using encryption keys received during pairing.

If the pairing, i.e. the authorization, is not done before the automatic connection, it may be done either at the time of the connection, or at the time of the request, e.g. when the button is pressed and the control unit 110 has determined who pressed it. This may for example be the case when the control unit 110 makes an authorization call to an access right database.

In some embodiments herein no pairing and no authorization and no encryption keys at all are used. Instead, the mobile device 120 may connect when in reach of the control unit 110, and then any security checks are done following the event.

When devices connect to each other in e.g. a piconet of Bluetooth, it's known there is a master-slave relationship between two devices. One of the devices is the master and the other devices are slaves. According to some embodiments herein, the control unit 110 may act as a master, and according to some other embodiments the respective mobile device 120-122 may act as the master.

In order to demonstrate a method for determining whether or not to carry out the action in response to the event generated in the access control system 100 according to the embodiments herein, an example scenario of access control to a physical area where the radio frequency communication is BLE, Bluetooth Low Energy, is described in relation to FIG. 1a in the following.

The control unit 110, in the form of a BLE enabled door station controlling the access to a door 111b, e.g. to a project office room, is located within an office environment. In the office environment there are several mobile devices 120-122, in the form of mobile telephones, with access apps, all paired to the door station 110 and having valid certificates, e.g. valid pre-authorization with verification that access right to the project office room is granted. In the office environment there are also mobile devices with access apps that are not paired to the door station, i.e. without a valid certificate and therefore with no access right to the project office room. The mobile devices 120-122 may be carried by users or they may be laying on a desk or in a bag in the office environment.

When in reach of the control unit 110, a paired mobile device 120 connects automatically to the control unit 110 and a secure communication channel via Bluetooth is established with the control unit 110. A user of a mobile device may give a request for the control unit 110 to carry out an action, e.g. a door opening command. The request may be implemented by pressing a button or touching a screen comprised in the access control system 100, e.g. on or at the control unit 110, or by any of the other methods mentioned above.

The request may be generated both by a user who is authorized to instigate the action but also by someone who is not, e.g. a user of an uncertified or unauthorized, or not paired or bonded mobile device, or even a user without a mobile device or a user with a mobile device, but without access app. A request at or on the control unit 110 may also be given by a user of a paired, but not connected mobile device, which may happen when the maximum number of connections to the control unit 110 have been reached. If a user of an uncertified or not paired mobile device or a user without mobile device or access app at all, presses the button or touches the screen on the control unit 110, the door should not be opened. If a user of a paired, but not yet connected mobile device presses the button or touches the screen on or at the control unit 110, this request should lead to that the door should be opened.

A problem that arises in this scenario is how the control unit 110 should verify that the user who gave the door opening command on the control unit 110 is an authorized user having a paired mobile device with a valid certificate and how the control unit 110 should determine whether to open or not to open the door.

When the control unit 110 receives an event as a result of a request given by someone at or on the control unit 110, a verification process is needed in order to determine if it is a user of a connected mobile device, or a user of a paired but not connected mobile device giving the request, and to decide if the requested action, e.g. to open the door, should be carried out or not.

Figure 2:
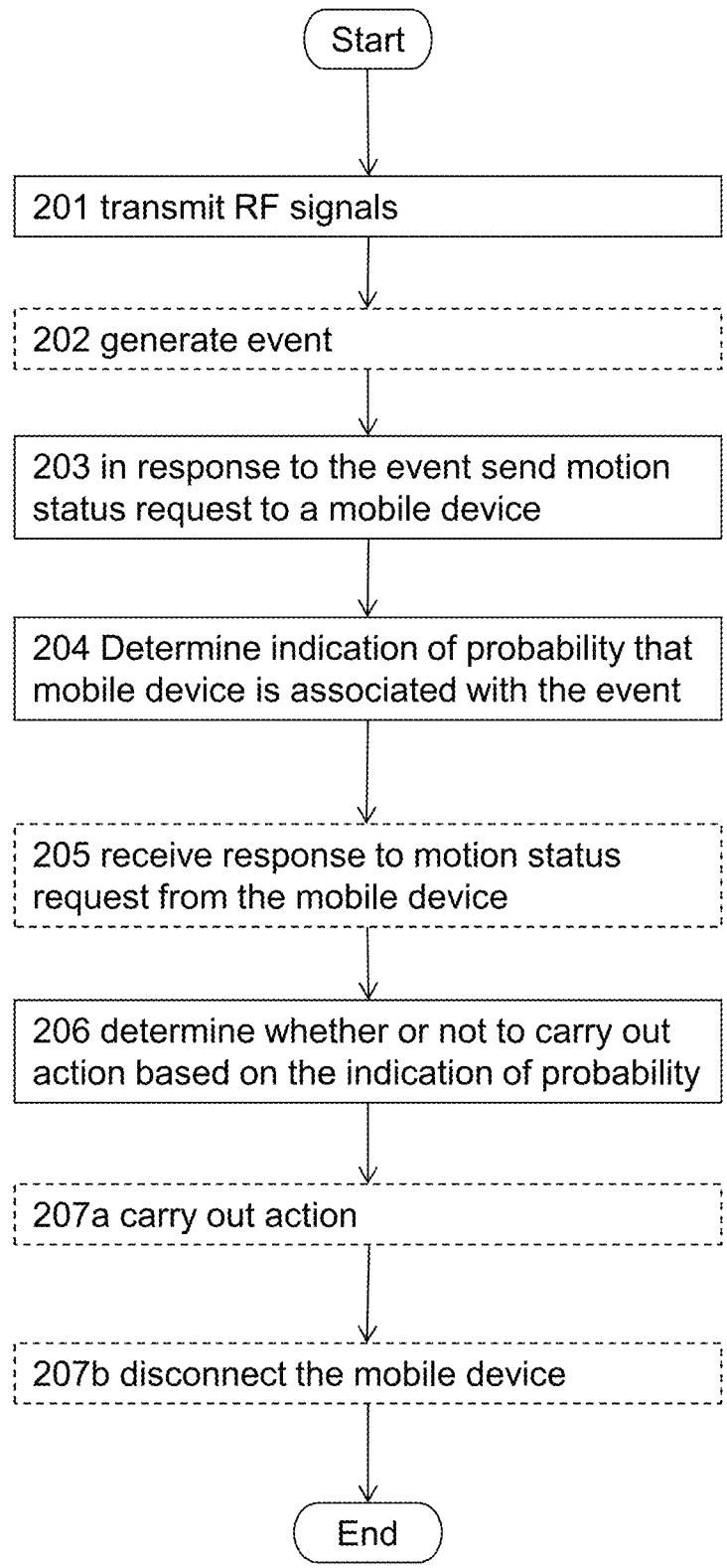
FIG. 2 is a flow chart illustrating a method performed by a control unit for access control according to embodiments herein.

In the following, a method solving the above problem will be described with reference to a flowchart presented in FIG. 2, and with further reference to the access control system illustrated in FIGS. 1a and 1b. The flowchart of FIG. 2 illustrates the method for determining whether or not to carry out the action in response to the event generated in the access control system 100. The problem is solved by determining whether or not to arrange to carry out an action in response to an event generated in the access control system 100. The event indicates a request for the control unit 110 to arrange to carry out the action. The event generated in the access control system 100 may be a result of a request given by a user of a mobile device 120. In some embodiments the user of the mobile device is a user of one of the one or more connected mobile devices 120-122. In other embodiments, the user of the mobile device is a user of the unconnected mobile device 123. Although the method is described below in relation to the connected mobile device 120 the method may be applied to multiple connected mobile devices 120-122, either in parallel or successively.

As mentioned above, the access control system comprises the control unit 110 connected to the one or more mobile devices 120-122 using radio-frequency signal communication.

One or more of the following actions presented in FIG. 2 may be performed in the following exemplifying order. In other examples, the order may differ from what is described below. The method may comprise the following actions:

Action 201

The control unit 110 arranges to transmit radio-frequency signals to be used for measurements of received signal strength by the one or more connected mobile devices 120-122. For example, in some embodiments the control unit 110 controls the radio-frequency transceiver 112 to transmit radio-frequency signals to be used for the measurements of received signal strength by the one or more connected mobile devices 120-122. In some embodiments the unit actually transmitting the RF signals, such as the radio-frequency transceiver 112, is not necessarily comprised in the control unit 110 as illustrated in FIG. 1a, but is connected to and controlled by, and optionally arranged in close proximity to, the control unit 110 as illustrated in FIG. 1b. As described above, it may be important that the radio-frequency transceiver 112 is arranged in close proximity of the request receiving unit 113 since a determination of a probability that the connected mobile device 120 is associated with the event is based on the RF signals transmitted from the transceiver 112.

These RF signals will be used as described below in action 204 to determine an indication of a probability that a specific connected mobile device 120 out of the one or more connected mobile devices 120-122 is associated with an event generated below in action 202.

Action 202

Then, at some point in time, someone generates an event indicating a request for the control unit 110 to arrange to carry out an action. For example, a user of a connected mobile device 120 generates an indication of a request to open the door 111*b*.

As mentioned above, in some embodiments the request for the control unit 110 to arrange to carry out the action comprises a request to grant access to a physical area, a logical area, a protected device 111*a*, 111*b*, or a protected resource. In those embodiments determining whether or not to arrange to carry out the action in response to the generated event comprises determining whether or not to grant access to the physical area, the logical area, the protected device 111*a*, 111*b*, or the protected resource.

Action 203

The control unit 110 starts the verification process upon generation of the event, by sending a respective motion status request to a respective one of the one or more connected mobile devices 120-122. The control unit 110 may send the respective motion status request to each of the connected mobile devices 120-122, or to a selection of the connected mobile devices 120-122, but at least to one of them.

Before sending the motion status request the control unit 110 may get an indication of the event, or may register the event. This may be the case if the event is generated in a separate unit, such as the request receiving unit 113.

In response to the generated event, the control unit 110 sends the motion status request to a connected mobile device 120 out of the one or more connected mobile devices 120-122.

The motion status request functions as a trigger for the connected mobile device 120 to compile received signal strength data and motion sensor data that is to be used for determining an indication of a probability that the connected mobile device 120 is associated with the event in the following action 204. In some embodiments the motion status request requests the connected mobile device 120 to respond with the indication of the probability that the connected mobile device 120 is associated with the event.

Action 204

Both the control unit 110 and the connected mobile device 120 may determine the indication of the probability that the connected mobile device 120 is associated with the event.

As mentioned above, determining the indication of the probability is based on received signal strength data, such as RSSI, and motion sensor data, such as accelerometer data or angular velocity data, of the connected mobile device 120. The received signal strength data is measured by the connected mobile device 120 on the radio-frequency signals transmitted during a first predetermined period of time before the motion status request from the control unit 110 is received. In other words, the received signal strength data is derived by the mobile device 120 from measurements on the radio-frequency signals transmitted.

The motion sensor data is collected from a motion sensor, comprised in the connected mobile device 120, during a second predetermined period of time before the motion status request from the control unit 110 is received. The second predetermined period of time may differ from the first predetermined period of time. It should be noted that each connected mobile device 120-122 may comprise a respective motion sensor although this is not shown in FIGS. 1*a* and 1*b*.

By determining the indication of the probability based on both the received signal strength data and the motion sensor data an increased accuracy of the determination is achieved compared to e.g. determining the probability based on only the received signal strength data. For example, the motion sensor data may be used to correct an estimation of the probability based on the received signal strength data as will be described in more detail below.

In some embodiments determining the indication of the probability comprises calculating an estimated value indicating the probability that the connected mobile device 120 is associated with the event based on the received signal strength data. The estimated value may for example comprise an estimated time to reach the request receiving unit 113, or the radio-frequency transceiver 112. As mentioned above, when the radio-frequency transceiver 112 is external to the control unit 110, it is preferably located close to the control unit 110.

In other embodiments the estimated value comprises an estimated distance to reach the control unit 110, possibly in combination with an estimated velocity, such as an estimated constant velocity. In yet other embodiments the estimated value comprises an estimated increase in signal strength to reach the control unit 110.

Determining the indication of the probability may further comprise calculating a correcting motion factor based on the motion sensor data and adjusting the estimated value with the correcting motion factor to obtain a corrected estimated value indicating the probability.

In some embodiments the corrected estimated value corresponds to a corrected estimated time to reach the radio-frequency transceiver 112. Then calculating the corrected estimated time to reach the radio-frequency transceiver 112 comprises calculating an estimated time for the mobile device 120 to reach the control unit 110 based on the received signal strength data, and calculating a correcting motion factor based on the motion sensor data, and adjusting the estimated time by the motion factor to obtain the corrected estimated time. For example, the estimated time may be divided by the motion factor as will be described in more detail below. In other embodiments the estimated time may be multiplied by the motion factor.

When the corrected estimated value has been calculated determining the indication of the probability may comprise comparing the corrected estimated value indicating the probability that the connected mobile device 120 is associated with the event with a predefined threshold value corresponding to a predefined probability that the connected mobile device 120 is associated with the event. For example, the corrected estimated value may be a corrected estimated time to reach the control unit which amounts to 5 seconds. The corrected estimated time may be compared to a threshold of 10 seconds. Times below the threshold time are associated with a high probability, which may be indicated with e.g. a "yes" or 95% probability or something similar.

In some embodiments determining the indication of the probability based on the received signal strength data and motion sensor data comprises calculating, by the connected mobile device 120, the corrected estimated value based on the received signal strength data and motion sensor data. Then the method may further comprise sending, by the connected mobile device 120, the indication of the probability, and/or or the corrected estimated value to the control unit 110 in response to the motion status request. The response to the motion status request will be further described below in relation to action 205.

When the control unit 110 sends the motion status request to multiple connected mobile devices 120-122 out of the one or more connected mobile devices 120-122 then determining the indication of the probability may comprise determining a respective indication of a probability that a respective one of the multiple connected mobile devices 120-122 is associated with the event. For such embodiments the determining whether or not to arrange to carry out the action, described below in action 206, comprises determining whether or not to arrange to carry out the action based on the respective indication of the probability. For example, the control unit 110 may determine to arrange to carry out the action in response to a first positive response to the multiple motion status requests. The method may then stop processing of further responses or the method may continue to process the further responses.

Details of action 204 will now be described. To estimate the probability that a user of the connected mobile device could be the one giving the request, on receipt of the motion status request the corrected estimated value may be calculated for each of the one or more connected mobile devices 120-122 based on the received signal strength data and the motion sensor data. The corrected estimated value may also be referred to as a combined value as it is a value based on both the received signal strength data and the motion sensor data.

The received signal strength may be measured by each of the connected mobile devices 120-122 on the radio frequency signals sent by the control unit 110, e.g. Bluetooth beacons sent by the control unit 110. The received signal strength may be measured over a period of time and then averaged to generate a received signal strength indicator, RSSI. The RSSI may be generated periodically, e.g. every second or every other second.

The received signal strength may be measured as a power level metric, by each of the connected mobile devices 120 121, 122, for instance on the radio frequency channel between the control unit 110 and each of the connected mobile devices 120-122 over a period of time to generate Received Channel Power Indicator (RCPI).

The received signal strength measured by each of the one or more connected mobile devices 120-122 during a first predetermined period of time is analyzed. The first period of time may for example be 10 seconds before the motion status request from the control unit 110 is received. The aim is to determine if the user of the mobile device 120 during the first period of time, e.g. last 10 seconds, before the event was generated, was approaching the control unit 110, or walking away from the control unit 110, or if the received signal strength is constant. A likely user giving the request is someone who is approaching the control unit 110 during the first predetermined period of time.

An estimated time to reach the radio-frequency transceiver 112, e.g. in seconds, may be calculated based on the received signal strength, for each one of the connected mobile devices 120-122. The estimated time indicates a time duration for the connected mobile device to reach the control unit 110. The estimated time may indicate a time from a known specific time, such as the time of transmission of the motion status request, or the time of reception of the motion status request, or a time with a pre-determined offset to any of the above times.

The estimated time may be calculated for each connected mobile device 120-122, and each time the respective connected mobile device 120-122 receives a motion status request from the control unit 110. For example, the estimated time may be calculated based on that a relationship between the received signal strength indicator value and the time may be defined as a linear model, $r=at+b$, where r is the received signal strength indicator, RSSI, and t is time. If the value of a is positive the connected mobile device 120 is approaching the control unit 110. A negative value of a means that the connected mobile device 120 is moving away. When a is close to 0 then there is no movement. Thus the a parameter may be seen as an estimated constant velocity. The parameters a and b may e.g. be estimated using "weighted ridge regression" and a number of RSSI values determined from collected received signal strength data over the first predetermined period of time, e.g. 10 seconds before the motion status request from the control unit 110 is received. The calculated a and b parameters may be seen as averaged values during the first pre-determined time period, especially when a constant velocity is assumed.

When constant movement, such as defined by a constant velocity, is assumed and with the RSSI value of $Rt=-55$ used as the RSSI value when the connected mobile device 120 has reached the control unit 110, a time to reach the radio-frequency transceiver 112 may be calculated as a time to hit, th, and is determined as $th=(Rt-b)/a$, e.g. being a value in seconds. Hence, the time, th, is an estimation for how many seconds is needed for reaching the threshold Rt if the movement remains constant, i.e. the time duration for the connected mobile device 120 to reach the control unit 110.

To improve the verification of the origin of the generated event, motion sensor data from one or more motion sensors, e.g. an accelerometer and/or a gyroscope, comprised in the connected mobile device 120, is taken into account to provide the corrected estimated value based on both the signal strength and the motion sensor data. The motion sensor data may be collected during a second predetermined period of time, e.g. 5 seconds, before the motion status request from the control unit 110 is received by the connected mobile device 120.

The corrected estimated value may be a motion compensated th value, calculated for each connected mobile device 120-122, and each time a connected mobile device 120 receives a motion status request from the control unit 110, by using the collected motion sensor data. The a parameter in the linear model above, may be adjusted by a calculated probability, p_movement, for that the connected mobile device 120 is moving, using known methods, so that $a\_compensated=p\_movement*a$. Using the $Rt=-55$, the RSSI value when the connected mobile device 120 has reached the control unit 110, a motion compensated th value is calculated as $th\_compensated=(Rt-b)/a\_compensated$, indicating the motion compensated time duration for the connected mobile device 120 to reach the control unit 110. This calculation may result in that the first connected mobile device 120 which may be not moving, or moving only with a low velocity or with a low acceleration, during the second predetermined time will be affected with a larger increase of the estimated time to reach the radio-frequency transceiver 112 than a second connected mobile device 121 where the collected motion sensor data indicated that the second connected mobile device 121 was moving more, e.g. with a higher velocity or with a higher acceleration, or with a higher angular velocity. The motion-compensated th value may be used by the connected mobile device 120 to make a decision as to if the user of the specific connected mobile device 120 could have given the request or not, by comparing with a suitable threshold, T. If the compensated th value for a certain connected mobile device 120 is higher than T, the likelihood is low that the user of the connected mobile device 120 issued the request. If th_compensated is lower than T the likelihood is high.

The motion sensor data may be collected from the one or more motion sensors in the connected mobile device 120, in e.g. one second segments and during 5 seconds before the request is received, and is analyzed to determine the motion factor. The motion factor may indicate a degree of change in motion of the connected mobile device 120, e.g. how much the motion of the connected mobile device 120 is increasing or decreasing. For example, the degree of change in motion may be described by a change in velocity. Such change of velocity may be related to an acceleration or an angular velocity measured by the motion sensor. The motion factor may be provided in percent, where e.g. 0% represents steady still and 100% represents a large increase in motion.

The corrected estimated value may be calculated based on the estimated time and the motion factor. That is, the corrected estimated value may be a motion compensated time estimate determined by adjusting the estimated time from the above RSSI calculation with the motion factor. The corrected estimated value may be proportional to the received signal strength and inverse proportional to the motion sensor data.

According some embodiments herein, the corrected estimated value may be calculated by dividing the estimated time derived from RSS data with the motion factor. Some examples are given below:

A movement factor of 50% provides a 100% increase of the estimated RSS time, i.e. the corrected estimated time RSS/0.50=2× the estimated time from RSS.

A movement factor of 75% provides a 33% increase of the estimated RSS time, i.e. the corrected estimated time RSS/0.75=1.33× the estimated time from RSS.

A movement factor of 100% provides no change to the estimated time from RSS, i.e. the corrected estimated time RSS/1.00=the estimated time from RSS.

The corrected estimated value thus indicates the probability that the request is given by a user of a connected mobile device. If the corrected estimated value of the connected mobile device 120 is less than a threshold, e.g. 10 seconds, it is determined that it is highly probable that the user of that specific connected mobile device 120 gave the request. Then the response to the motion status request is a positive response indicating, e.g. "yes, it is likely that my user gave the request". If a connected mobile device 120 lies still on a desk, its motion factor may be 0%, but the RSS values may still be varying, perhaps due to that another person moves between the mobile device and the control unit 110 Then the estimated time from RSS may be severely increased by the motion factor so that the corrected estimated value is larger than 10 seconds, which indicates that it is not possible that the user of this connected mobile 120 device gave the request. In this case the response to the motion status request is negative, e.g. "No, it is not likely that my user gave the request".

The corrected estimated value, based on the received signal strength and motion sensor data, may be calculated in any other suitable method, for instance as a motion compensated distance or as a motion compensated quality indicator. The corrected estimated value may directly indicate the probability that the request is given by the user of the connected mobile device 120, or it may be compared with a predetermined value, where the predetermined value is selected to correspond to the method used to calculate the corrected estimated value.

As mentioned above. the corrected estimated value may be calculated by each of the one or more connected mobile devices 120-122. The corrected estimated value may also be calculated by the control unit 110 for each of the one or more connected mobile devices 120-122.

Action 205

In response to the motion status request from the control unit 110 the control unit 110 may receive the indication of the probability, or the corrected estimated value. In some embodiments the received corrected estimated value comprises the estimated value based on the received signal strength data and the motion factor based on the motion sensor data. Thus the control unit 110 may calculate the corrected estimated value based on the received estimated value and the motion factor, e.g. by applying the methods presented above in connection with the description of action 204.

If the control unit 110 receives the indication of the probability from the connected mobile device 120, then the control unit 110 may base the determination of whether or not to arrange to carry out the action directly based on the received indication of the probability.

If on the other hand the control unit 110 receives the corrected estimated value from the connected mobile device 120 then the control unit may first determine the indication of the probability based on the corrected estimated value, and then determine whether or not to arrange to carry out the action. The determination of the indication of the probability may be performed as described above in connection with action 204.

In yet some other embodiments the control unit 110 receives the received signal strength data and motion sensor data from the connected mobile device 120 in response to the motion status request. Then determining the indication of the probability that the connected mobile device 120 is associated with the event based on the received signal strength and motion sensor data comprises calculating, by the control unit 110, the corrected estimated value based on the received signal strength data and motion sensor data.

However, since the connected mobile device 120 has direct access to both the signal strength data and motion sensor data there is an advantage to let the connected mobile device 120 calculate the corrected estimated value, or at least the estimated value and the motion factor, and then send the estimated value and the motion factor, and/or the corrected estimated value, and/or the indication of the probability that the connected mobile device 120 is associated with the event to the control unit 110, which then uses the response from the connected mobile device 120 to determine whether or not to carry out the action.

Action 206

The control unit 110 then determines whether or not to arrange to carry out the action based on the indication of the probability that the connected mobile device 120 is associated with the event.

Determining whether or not to arrange to carry out the action based on the indication of the probability that the connected mobile device 120 is associated with the event may comprise determining to carry out the action if the indication of the probability that the connected mobile device 120 is associated with the event fulfils a predefined condition, such as being larger than a pre-determined threshold probability.

In other embodiments, the control unit 110 determines to not carry out the action if the indication of the probability that the connected mobile device 120 is associated with the event does not fulfil the predefined condition, or if there is no response from the connected mobile device 120 to the motion status request within a time limit.

Action 207a

The requested action may be carried out in response to the determining when the control unit 110 has determined whether or not to arrange to carry out the action. For example, the door 111b may be unlocked, or unlocked and opened if the control unit has determined to carry out the action. This may for example be the case when the connected mobile device 120 has sent a response to the motion status request and the response comprises an indication that the connected mobile device 120 is likely to be associated with the event. For example, the response may comprise a corrected estimated time which is below a certain time limit, such as below one second.

If on the other hand the control unit 110 has determined not to carry out the action, then the control unit 110 may for example keep the door 111b in the locked state.

An action may be determined to carry out the requested action, e.g. open a door, if the corrected estimated value of a connected mobile device indicates that its user gave the request. It may also be determined to not carry out the requested action, e.g. not open the door, if the corrected estimated values of all the connected device indicate that none of the users of the connected devices gave the request. An action may also be determined to release at least one connection between a mobile device and the control unit 110 to enable other mobile devices connecting to the control unit 110, since the request may have been given by a user of a not connected mobile device. By releasing one connection, this mobile device can connect to the control unit 110 and allow the user of this mobile device to instigate the action.

Action 207b

When it has been determined to not carry out the action, the method may further comprise releasing a connection between the connected mobile device 120 and the control unit 110, or releasing a respective connection between each of the one or more connected mobile devices 120-122 and the control unit 110. In other words, the control unit 110 may disconnect the connected mobile device 120 from the control unit 110, or disconnect all the one or more connected mobile devices 120-122 from the control unit 110. The releasing of the connections, or in other words the disconnection of connected mobile devices 120-122, may be an advantage in a scenario where a maximum number of connections of the control unit 110 are used by the connected mobile devices 120-122, but none of the users of the connected mobile devices 120-122 generated the event in the access control system 100. Instead, the request may have been given by a user of the unconnected mobile device 123. By disconnecting the connected mobile devices 120-122, i.e. releasing the connections of the connected mobile devices 120-122, the control unit 110 enables other not connected mobile devices to connect to the control unit 110, and then the search for the connected mobile 120 device that is associated with the event may continue.

Figure 3:
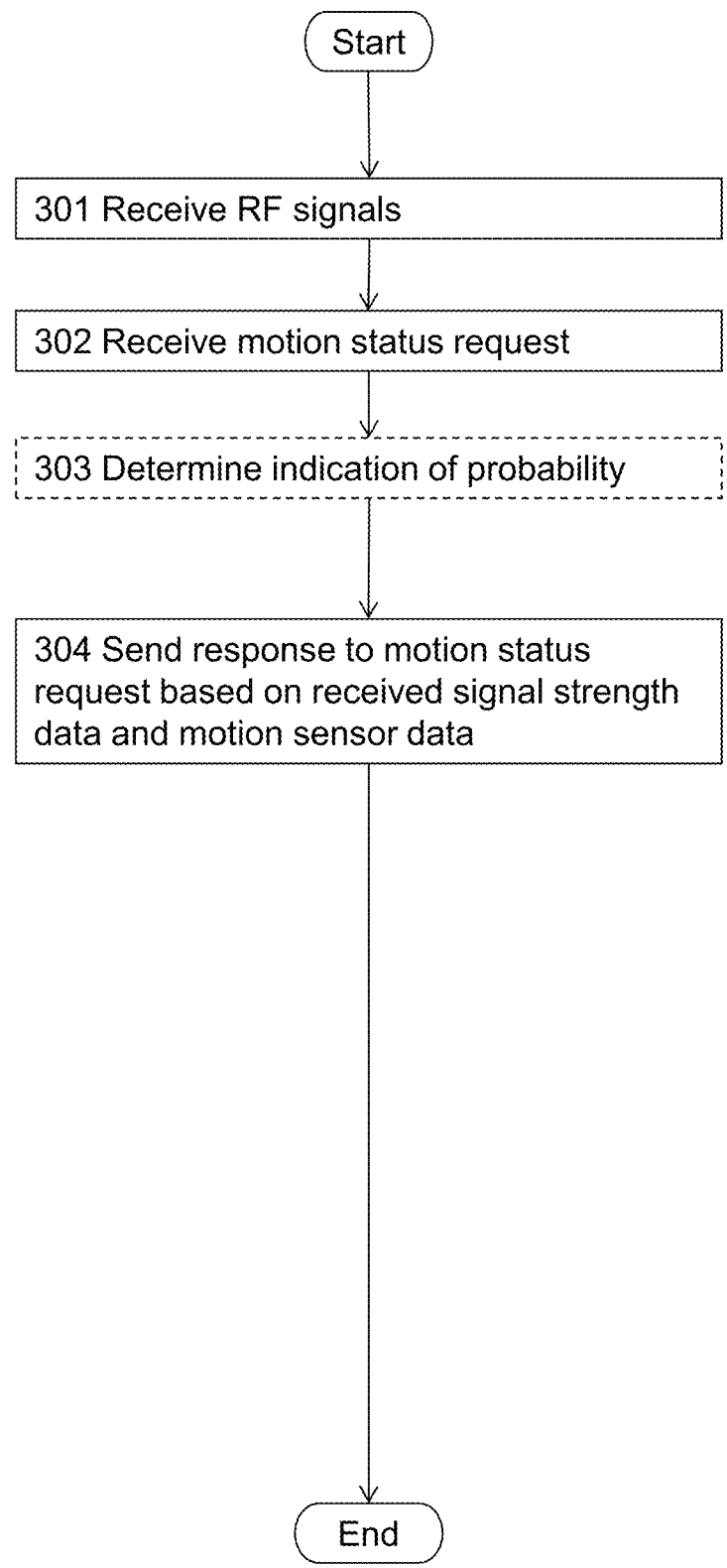
FIG. 3 is a flow chart illustrating a method performed by a mobile device for access control according to embodiments herein.

Embodiments will now be described briefly from the perspective of the connected mobile device 120. FIG. 3 presents a flowchart for a method performed by the connected mobile device 120. As mentioned above, the access application of the connected mobile device 120 may perform or arrange for the connected mobile device 120 to perform some of the below actions. In some embodiments the respective access application arranges for the cloud service or webserver to perform the below actions. The below actions may for example refer to receiving the radio-frequency signals transmitted by the access control system 100 to be used for measurements of received signal strength, and/or receiving the motion status request from the control unit 110, and/or determining the indication of the probability, and/or sending the indication of the probability and/or the corrected estimated value to the control unit 110.

Action 301

As mentioned above, the connected mobile device 120 receives the radio-frequency signals transmitted by the access control system 100 to be used for measurements of received signal strength.

Action 302

When an event has been generated in the access control system the connected mobile device 120 receives the motion status request from the control unit 110.

Action 303

As mentioned above the connected mobile device 120 may determine the indication of the probability. This may be done according to the embodiments described above on relation to action 204. For example, the connected mobile device 120 may calculate the corrected estimated value based on the received signal strength data and the motion sensor data and may then determine the indication of the probability based on the corrected estimated value. The corrected estimated value may be compared with a threshold value, such as a threshold time to reach the radio-frequency transceiver 112 and a corresponding indication of the probability may be determined based on the comparison with the threshold value.

Action 304

As mentioned above, e.g. in relation to action 205, in some embodiments when the connected mobile device 120 calculates the corrected estimated value based on the received signal strength data and motion sensor data the connected mobile device 120 sends the indication of the probability and/or the corrected estimated value to the control unit 110. The connected mobile device 120 sends the indication of the probability and/or the corrected estimated value in response to the motion status request received from the control unit 110.

In some other embodiments the connected mobile device 120 sends the received signal strength data and the motion sensor data to the control unit 110. Then the control unit 110 determines the indication of the probability based on the received signal strength data and the motion sensor data. Determining the indication of the probability by the control unit 110 may in this case comprise calculating the corrected estimated value based on the received signal strength data and the motion sensor data.

As mentioned above, there are different alternatives of how to determine whether or not to arrange to carry out the action based on the the indication of the probability that the connected mobile device (120) is associated with the event, depending on where the indication of the probability is determined, and further depending on where the corrected estimated value is calculated, and further depending on what the response to the motion status request comprises.

Figure 4:
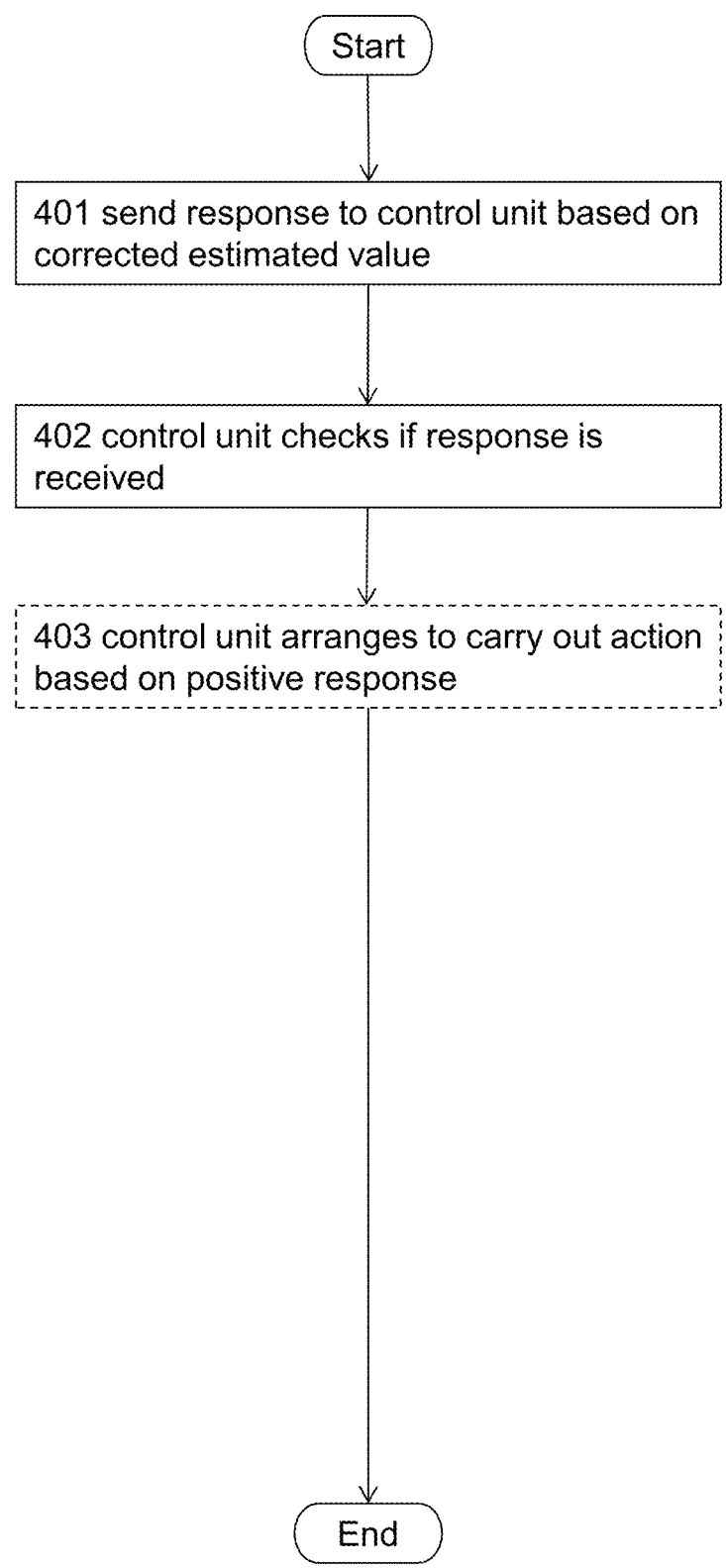
FIG. 4 is a flow chart illustrating a method performed by a control unit and a mobile device for access control according to embodiments herein.

If e.g. the corrected estimated value is calculated by each of the one or more connected mobile devices 120-122, the method may further comprise the following actions shown in FIG. 4.

Action 401

In response to the motion status request, each of the one or more connected mobile devices 120-122 may send a response to the control unit 110 based on its corrected estimated value.

To provide the response, the connected mobile device 120 may assess if the corrected estimated value fulfils a predetermined condition. The predefined condition may be fulfilled when the corrected estimated value, adjusted by the motion sensor data, is less than a predefined threshold, e.g. 10 seconds, for instance if the combine value is inversely proportional to the motion sensor data.

Alternatively, the predefined condition may be fulfilled when the combined value is larger than a predefined threshold, for example, if the motion sensor data is provided in a way so that the corrected estimated value, when adjusted by the motion sensor data, is proportional to the motion sensor data.

Each of the connected mobile devices 120-122 may send a positive response to the control unit 110, if its corrected estimated value fulfils the predetermined condition.

Each of the connected mobile devices 120-122 may send a negative response or may not send any response to the control unit 110, if its corrected estimated value does not fulfil a predetermined condition.

According to some embodiments herein, the connected mobile device 120 may send a positive response together with an authorization to instigate the action. The authorization may be a certificate the connected mobile device 120 received in an initialization phase indicating that the user of the connected mobile device 120 has the right to access the resource controlled by the control unit 110, e.g. open the door.

As already mentioned, in other embodiments the connected mobile device 120 is already authorized to access the resource when connecting to the control unit 110. Also here the authorization may have been received during an initialization phase. In yet other embodiments, the control unit 110 carries out the authorization verification prior to carrying out the requested action according to Action 250, 251 or 243

Sending a positive response together with the authorization takes almost the same time as just sending the positive response since it is only one message is sent.

Action 402

The control unit 110 checks if any response is received from the one or more connected mobile devices 120-122.

Action 403

If a positive response is received, the control unit 110 arranges to carry out the requested action, such as give access to a physical area, e.g. open the door, or give access to the content of a logical area, to a protected device or to a protected resource.

Figure 5A:
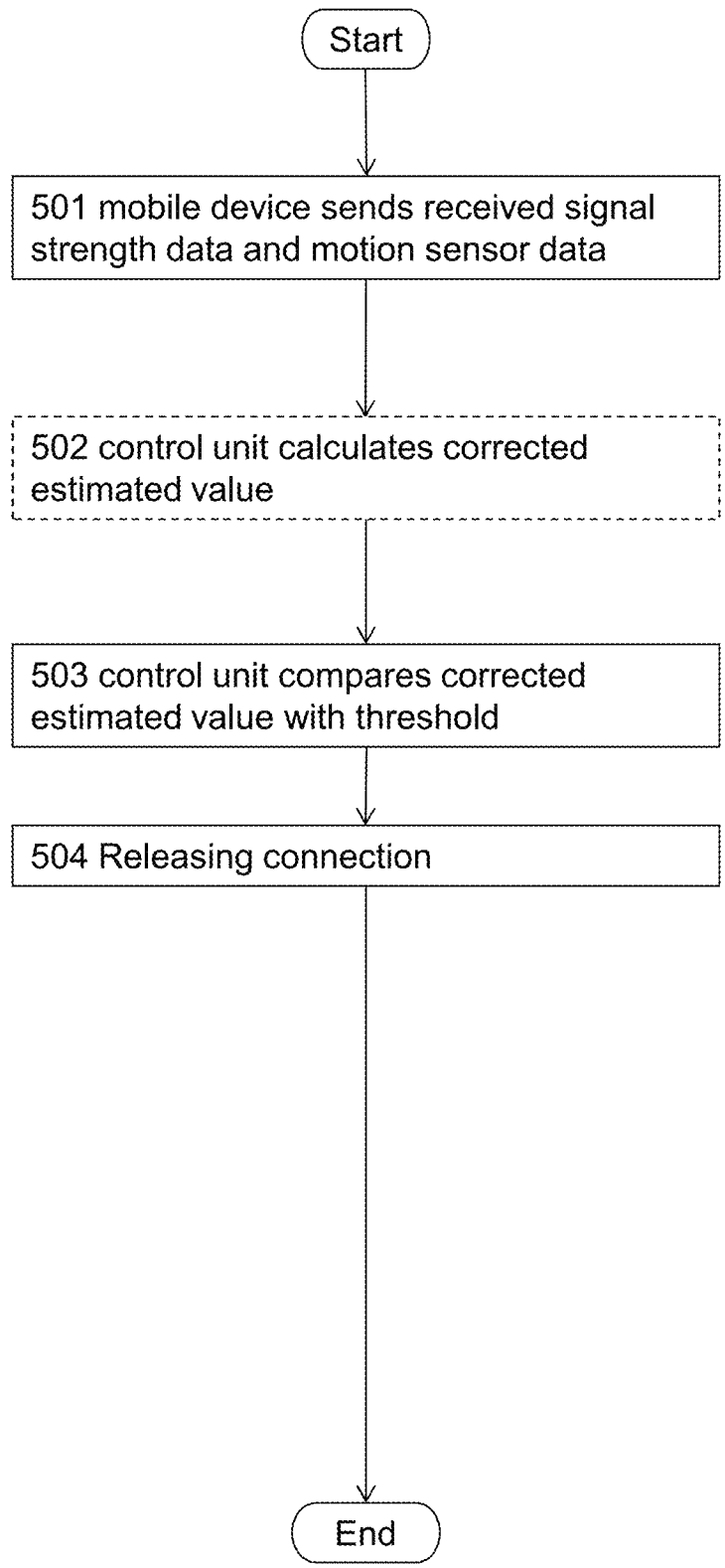
FIG. 5a is a flow chart illustrating a further method performed by a control unit and a mobile device for access control according to embodiments herein.

If the corrected estimated value is calculated by the control unit 110, then instead of actions 231, 232 and 251 the method may comprise the following actions shown in FIG. 5:

Action 501

In response to the status request, the connected mobile device 120 sends its received signal strength data and motion sensor data to the control unit 110.

Action 502

The control unit 110 receives the received signal strength and motion sensor data sent from the one or more connected mobile devices 120-122 and calculates the corrected estimated value for each of the one or more connected mobile devices 120-122.

Action 503

The control unit 110 compares each of the corrected estimated values with a predefined threshold. The control unit 110 then determines that the user of the connected mobile device 120 has given the request if the corrected estimated value from that connected mobile device 120 fulfils a predefined condition, and arranges to carry out the requested action, such as give access to the physical area, e.g. open the door, or give the access to the content of the logical area, to the protected device or to the protected resource.

If no response is received or only negative responses are received or all the corrected estimated values do not fulfil the predetermined condition, the method may further comprise the following action.

Action 504

If no response or a negative response is received from the connected mobile device 120, or if the corrected estimated value does not fulfil a predetermined condition then the control unit 110 may release the connection between the connected mobile device 120 and the control unit 110 to enable other mobile devices to be connected to the control unit 110. Releasing the connection may be advantageous since the request may be given by the unconnected mobile device 123. By releasing the connection, the unconnected mobile device 123 is able to connect to the control unit 110 which allows the control unit 110 to verify if it is the user of the previously unconnected mobile device 123 who requested the action to be instigated. Releasing a connection between the connected mobile device 120 and the control unit 110 may mean that the physical radio frequency communication channel between the connected mobile device 120 and the control unit 110 established during the connection process is dropped, released or disconnected. The terminology of may vary depending on type of RF communication protocol used.

In some embodiments the control unit 110 may release any of the connections between the control unit 110 and the connected mobile devices 120-122 based on an absent response or a negative response from the connected mobile device 120, or if the corrected estimated value based on the response from the connected mobile device 120 does not fulfil a predetermined condition. That is, the control unit 110 does not necessarily release the connection of the responding connected mobile device 120.

In some other embodiments the control unit 110 releases one or more connections if no response is received from any connected mobile device 120-122, or if only negative responses are received, or each of the corrected estimated values does not fulfil the predetermined condition.

According to some embodiments herein, releasing at least one connection may comprise releasing all connections of the connected mobile devices 120-122 where no response is received by the control unit 110, or only negative responses are received, or if the corrected estimated value does not fulfil the predetermined condition. Even if a positive response has been received, leading to that the control unit 110 carries out the action, the connections to all mobile devices may be released. In this way, the power consumption is reduced for these mobile devices and also allows other devices to automatically connect to the control unit 110.

The releasing of the connection may be initiated by the control unit 110, for instance by assigning the physical radio frequency communication channel to another paired mobile device and for instance returning the previously connected mobile device 120 to an unconnected state, depending on situation.

In addition to using the motion sensor data to calculate the corrected estimated value, the collected motion sensor data may also be used to decide when a mobile device should connect to the control unit 110 automatically as described above. For example, if a mobile device is still, it is assumed that it is placed on a desk and that its user has no interest in requesting the control unit 110 to carry out an action. This mobile device will therefore not start the process to establish a connection. This will save battery life of the mobile device and also will prevent blocking the available connections with non-useful connections. This is important as there may be a limit for the number of connections both for the control unit 110 and for the mobile device itself. Moreover, by using the received signal strength data and the motion sensor data the mobile device is able to determine whether or not to connect to the control unit 110 based on factors which are related to whether or not the user of the mobile device is likely to issue a request to the control unit 110 in the close future. This ensures that the requested action is carried out swiftly as the connection time may then be omitted.

As mentioned above, the control unit 110 may also make a forced disconnect of at least one of the other connections, alternatively all the connections that returned a negative response may be disconnected by force. This may be done to open up a new spare connection.

In order to prohibit a ping-pong effect related to releasing and re-connecting the connections, re-connection of a now disconnected and previously connected mobile device 120 may be prohibited, at least during a time period, such as a prohibit or back-off time period. For example, automatic re-connection may be prohibited during the prohibit time period. A problem arises in such a scenario. For example, after a forced release of the connection of the previously connected mobile device 120 a further request for the control unit 110 to arrange to carry out an action may be given by the user of the previously connected mobile device 120. For example, the user of the previously connected mobile device 120 gives a command to unlock or open the door 111b.

However, if the control unit 110 is limited to investigate whether or not to carry out the action in response to the further event based on communication with the now connected mobile devices, the above described problem leads to that the user of the previously connected and now forcedly disconnected mobile device 120 may not only be prohibited from reconnecting to the control unit 110 by the above described method, but the control unit 100 may not be able to determine that it is the user of the disconnected mobile device that gave the request if this is the case. As a consequence, the control unit 110 may not carry out the requested action if it was the user of the disconnected mobile device that gave the request.

In other words, for the previously connected mobile device 120 (including its applications) to be able to reconnect automatically to the control unit 110, there may be a back-off time after which any previously connected mobile device can again freely connect to the control unit 110. However, such a back-off time will stop the user of the previously connected mobile device 120 to request the control unit 110 to arrange to carry out the requested action, e.g. to arrange to open the door, within this back-off time.

Embodiments herein solve the above problem by allowing the previously connected mobile device 120 to re-connect based on an indication of whether or not the second event has been generated. Specifically, the previously connected mobile device 120 is allowed to re-connect during the back-off period if the indication of whether or not the second event has been generated indicates that the second event has been generated. The solution may also include that a previously connected mobile device 120 is not allowed to re-connect during the back-off period if the indication of whether or not the second event has been generated indicates that a second event has not been generated.

The determination as to whether or not to allow the re-connection may be made both by the control unit 110, e.g. after having received a re-connection attempt, and by the previously connected mobile device 120 before the re-connection attempt. By letting the previously connected mobile device 120 make the determination less failed re-connection attempts will be made.

In order for the previously connected mobile device 120 to be able to make a determination as to whether or not to allow the re-connection, such that re-connections attempts are not made when such attempts shouldn't be made, the control unit 110 may send the indication of whether or not the second event has been generated to the previously connected mobile device 120, e.g. in a broadcasted transmission. This may for example be implemented in the form of a value of a counter of events.

Thus, not to stop the user of the previously connected mobile device 120 to request the control unit 110 to arrange to carry out the requested action, e.g. to arrange to open the door, within the back-off time, there is a fail-safe mechanism as described above.

In some embodiments the control unit 110 keeps a counter of number-of-times-the-door-opening-command-has-been-activated. The value of this counter may be sent out together with the Bluetooth hello message.

When the previously connected mobile device 120 is disconnected by force, it may not reconnect until the door opening command counter has been increased, which means not before someone has given the door opening command again, or when a timer corresponding to the back-off time is out.

Figure 5B:
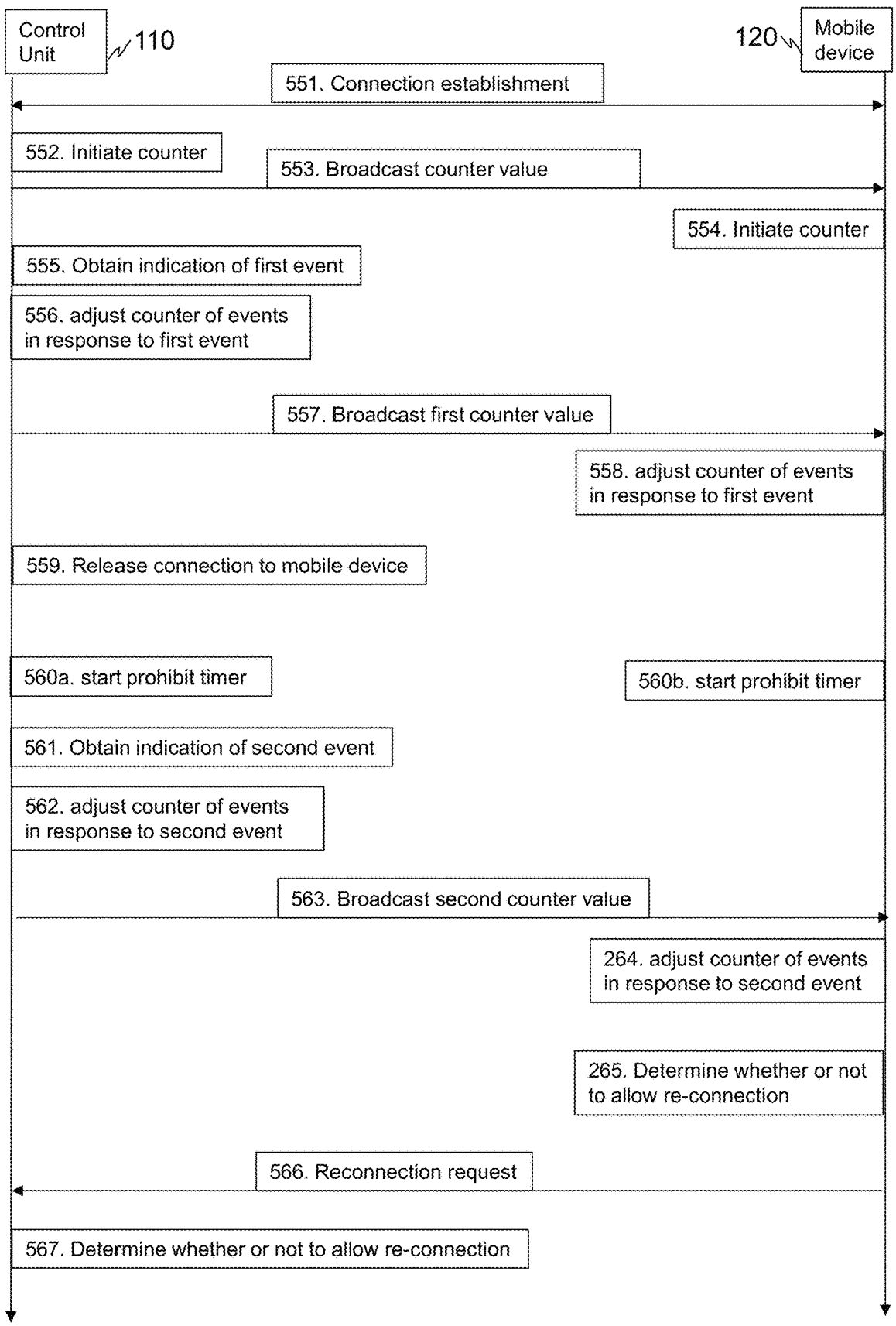
FIG. 5b is a signalling diagram illustrating a method for handling a radio-frequency connection between a control unit and a mobile device of an access control system according to embodiments herein.

In the following, a method solving the above problem will be described in detail with reference to a signaling diagram presented in FIG. 5b, and with further reference to the access control system 100 illustrated in FIGS. 1a and 1b. The signaling diagram of FIG. 5b illustrates the method for handling the radio-frequency connection between the control unit 110 and the connected mobile device 120 of the access control system 100.

The method will be exemplified by referral to Bluetooth terminology, but the method is equally applicable to other radio-frequency communication protocols.

Although the method is described below in relation to the connected mobile device 120 the method may be applied to multiple connected mobile devices 120-122, either in parallel or successively.

As mentioned above, the access control system comprises the control unit 110 connected to the one or more mobile devices 120-122 using radio-frequency signal communication.

One or more of the following actions presented in FIG. 5b may be performed in the following exemplifying order. In other examples, the order may differ from what is described below. The method may comprise the following actions:

Action 551

At some point in time the radio-frequency connection between the control unit 110 and the connected mobile device 120 has been established. In some embodiments herein the connection has been established automatically when the connected mobile device 120 came close enough to the control unit 110 to receive a Hello message.

Action 552

Then, in order for the control unit 110 to be able to let the connected mobile device 120 to make the determination as to whether or not to allow a future re-connection when it has been released from the connection, such that re-connections attempts are not made when such attempts shouldn't be made, the control unit 110 may keep track of the number of generated events. The track-keeping may be implemented by a counter of events. The counter of events may be given an initial value at some point in time, e.g. zero.

Action 553

The control unit 110 may broadcast an indication of whether or not an event has been generated. For example, the control unit 110 may broadcast a counter value. The counter value may correspond to the number of events generated.

The indication of whether or not the event has been generated may for example be broadcasted in a Hello message sent by the control unit 110 using Bluetooth.

The connected mobile device 120 may receive the indication of whether or not an event has been generated, e.g. by a broadcasted transmission from the control unit 110. For example, the connected mobile device 120 may receive the counter value.

Action 554

If the connected mobile device 120 has received the indication of whether or not an event has been generated, it may keep track of the number of events generated. For example, the connected mobile device 120 may initiate or update its own counter of events with the received counter value.

Action 555

The control unit 110 obtains an indication of a first event generated in the access control system 100 in response to a first request for the control unit 110 to arrange to carry out an action.

The event generated in the access control system 100 may be a result of a request given by a user of a mobile device 120 out of one or more mobile devices 120-123.

Action 556

The control unit 110 may adjust the counter of events to the first counter value in response to the first event. Adjusting the counter may for example comprise increasing the counter. The counter may for example be increased by one in response to an event, such as the first event.

Action 557

In some embodiments the connected mobile device 120 obtains the indication of the first event. For example, the control unit 110 may broadcast the first counter value such that it is received by all mobile devices 120-123, including the connected mobile device 120, within reach of the radio-frequency communication used by the control unit 110 when communicating with the connected mobile devices 120-122.

The indication of the first event, such as the first counter value, may for example be broadcasted in a Hello message sent by the control unit 110 using Bluetooth.

In some embodiments the indication of the first event comprises a first counter value corresponding to the first event.

Action 558

The connected mobile device 120 may adjust the counter of events to the first counter value in response to the first event.

Action 559

The control unit 110 then releases the radio-frequency connection between the mobile device 120 and the control unit 110 as a result of the generated first event. For example, the control unit 110 may release the radio-frequency connection between the connected mobile device 120 and the control unit 110 to enable other mobile devices to be connected to the control unit 110. Releasing the connection may be advantageous since the request may be given by the unconnected mobile device 123. By releasing the connection, the unconnected mobile device 123 is able to connect to the control unit 110 which allows the control unit 110 to verify if it is the user of the previously unconnected mobile device 123 who requested the action to be instigated. Releasing the radio-frequency connection between the connected mobile device 120 and the control unit 110 may mean that the physical radio frequency communication channel between the connected mobile device 120 and the control unit 110 established during the connection process is dropped, released or disconnected. The releasing of the connection may be initiated by the control unit 110, for instance by assigning the physical radio frequency communication channel to another paired mobile device and for instance returning the previously connected mobile device 120 to an unconnected state, depending on situation.

The mobile device 120 may be prohibited from re-connecting to the control unit 110 within a pre-determined time duration from the release of the connection unless the second event has been generated during the pre-determined time duration.

In some embodiments herein the release of the connection by the control unit 110 is performed in response to not being able to determine which connected mobile device out of one or more connected mobile devices 120-122 that is associated with the event.

In some further embodiments herein the release of the connection by the control unit 110 is performed if the number of connected mobile devices is larger than a maximum number of mobile devices allowed to connect to the control unit 110 simultaneously.

In yet some further embodiments herein the release of the connection by the control unit 110 is performed in response to not being able to determine which connected mobile device out of one or more connected mobile devices 120-122 that is associated with the event if the number of connected mobile devices is larger than a maximum number of mobile devices allowed to connect to the control unit 110 simultaneously. That is a combination of the above embodiments is possible.

In some embodiments the control unit 110 may release any of the connections, e.g. one or more connections, between the control unit 110 and the connected mobile devices 120-122.

The control unit 110 may select the radio-frequency connection between the connected mobile device 120 and the control unit 110 to be released by selecting a connection to be released among one or more connections between the control unit 110 and the one or more connected mobile devices 120-122 based on which connection that was established first.

In some other embodiments the at least one connection to be disconnected could be selected based on an analysis of distance and motion of the connected mobile devices 120-122, such that connected mobile devices that are further away and/or not moving are disconnected first.

Action 560a

The control unit 110 may start a prohibit timer in response to the release of the connection to the previously connected mobile device 120. The prohibit timer may also be referred to as a back-off timer. If the prohibit timer is used and has ran out the previously connected mobile device 120 is allowed to re-connect, e.g. by automatic re-connection when it is able to communicate with the control unit 110. For example, the previously connected mobile device 120 may be allowed to automatically re-connect once it receives a hello message from the control unit 110.

Action 560b

Also the previously connected mobile device 120 may start a prohibit timer in response to the release of the connection to the previously connected mobile device 120.

Action 561

After the release of the connection by the control unit 110, the control unit 110 obtains an indication of whether or not a second event has been generated in the access control system 100 in response to a second request for the control unit 110 to arrange to carry out the action. For example, the control unit 110 may obtain an indication that the second event has been generated in the access control system 100 in response to a second request for the control unit 110 to arrange to carry out the action. For example, the user of the previously connected mobile device 120 may have given a command to open the door 111b at request receiving unit 113.

Action 562

The control unit 110 may adjust the counter of events to a second counter value in response to the second event, i.e. if the second event has been generated.

Action 563

In some embodiments the previously connected mobile device 120 obtains the indication of the second event. For example, the control unit 110 may broadcast the indication of whether or not the second event has been generated. The control unit 110 may broadcast the indication of whether or not the second event has been generated in response to the second request for the control unit 110 to arrange to carry out the action.

In correspondence, obtaining the indication of whether or not the second event has been generated may then comprise receiving, by the previously connected mobile device 120, the indication. Thus, the indication of whether or not the second event has been generated may be received in the broadcasted message from the control unit 110, When the indication of the second event comprises the counter value corresponding to the second event, then broadcasting the indication of whether or not the second event has been generated comprises broadcasting the second counter value.

The indication of the second event, such as the second counter value, may for example be broadcasted in a Hello message sent by the control unit 110 using Bluetooth.

Action 564

The previously connected mobile device 120 may adjust the counter of events to the second counter value in response to the second event, i.e. if the second event has been generated. That is, the previously connected mobile device 120 may adjust the counter of events to the second counter value in response to the obtained indication of the second event. For example, the previously connected mobile device 120 may adjust the counter of events to the second counter value if it receives the counter value, such as the second counter value, from the control unit 110 that differs from the first counter value stored in the previously connected mobile device 120.

Action 565

In some embodiments the previously connected mobile device 120 then determines based on the indication of whether or not the second event has been generated, whether or not to allow the mobile device 120 to re-connect to the control unit 110.

Determining whether or not to allow the mobile device 120 to re-connect to the control unit 110 may comprise determining, by the mobile device 120, whether or not to send the connection request. The connection request may be a re-connection request.

In some embodiments determining whether or not to allow the mobile device 120 to re-connect to the control unit 110 is further based on a comparison of a time duration from the release of the connection with a pre-determined time duration from the release of the connection. The pre-determined time duration from the release of the connection may for example be the back-off time or the prohibit time which indicates the time during which the previously connected mobile device 120 is prohibited from re-connecting to the control unit 110. The determining may be performed within the pre-determined time. Once the pre-determined time has elapsed the previously connected mobile device 120 may be free to re-connect, e.g. without taking into account the indication of whether or not the second event has been generated.

The previously connected mobile device 120 determines to allow the mobile device 120 to re-connect to the control unit 110 if the indication of whether or not the second event has been generated indicates that the second event has been generated.

When the indication of the second event comprises the counter value corresponding to the second event then determining whether or not to allow the mobile device 120 to re-connect to the control unit 110 comprises determining, based on the value of the counter of events, to allow the mobile device 120 to re-connect to the control unit 110 if the value of the counter of events has been adjusted to the second counter value.

Action 566

In some embodiments the control unit 110 receives the connection request from the mobile device 120. The connection request may be received within the pre-determined time from the release of the connection

Action 567

In some embodiments the control unit 110 determines, based on the indication of whether or not the second event has been generated, whether or not to allow the mobile device 120 to re-connect to the control unit 110. For example, the control unit 110 may determine whether or not to allow the mobile device 120 to re-connect to the control unit 110 when it receives the connection request from the mobile device 120. In some embodiments the previously connected mobile device 120 connects to the control unit 110 and the control unit 110 disconnects the mobile device 120 again by force.

In some embodiments determining whether or not to allow the mobile device 120 to re-connect to the control unit 110 is further based on the comparison of the time duration from the release of the connection with the pre-determined time duration from the release of the connection. The determining may be performed within the pre-determined time, which may be the back-off or prohibit time mentioned above. Once the pre-determined time has elapsed the previously connected mobile device 120 may be free to re-connect.

The control unit 110 determines to allow the mobile device 120 to re-connect to the control unit 110 if the indication of whether or not the second event has been generated indicates that the second event has been generated. The second event may have been generated within the pre-determined time.

When the indication of the second event comprises the counter value corresponding to the second event then determining whether or not to allow the mobile device 120 to re-connect to the control unit 110 comprises determining, based on the value of the counter of events, to allow the mobile device 120 to re-connect to the control unit 110 if the value of the counter of events has been adjusted to the second counter value.

Enumerated example embodiments of a method for handling the radio-frequency connection between the control unit 110 and the mobile device 120 will now follow.

1. A method for handling a radio-frequency connection between a control unit 110 and a mobile device 120 of an access control system 100, the method comprising:
    obtaining an indication of a first event generated in the access control system 100 in response to a first request for the control unit 110 to arrange to carry out an action;
    after a release of the connection by the control unit 110, obtaining an indication of whether or not a second event has been generated in the access control system 100 in response to a second request for the control unit 110 to arrange to carry out the action;
    determining, based on the indication of whether or not the second event has been generated, whether or not to allow the mobile device 120 to re-connect to the control unit 110.
2. The method according to example embodiment 1, wherein determining whether or not to allow the mobile device 120 to re-connect to the control unit 110 comprises:
    determining to allow the mobile device 120 to re-connect to the control unit 110 if the indication of whether or not the second event has been generated indicates that the second event has been generated.
3. The method according to example embodiment 1 or 2, wherein the mobile device 120 is prohibited from re-connecting to the control unit 110 within a pre-determined time duration from the release of the connection unless the second event has been generated during the pre-determined time duration.
4. The method according to any of the example embodiments 1-3, further comprising:
    broadcasting, by the control unit 110, the indication of whether or not the second event has been generated.
5. The method according to example embodiment 4, wherein the respective indication of the first and second events comprises a respective counter value corresponding to the respective event, the method further comprising:
    adjusting a counter of events to a first counter value in response to the first event;
    broadcasting, by the control unit 110, the first counter value;
    adjusting the counter to a second counter value if the second event has been generated;
    wherein broadcasting the indication of whether or not the second event has been generated comprises broadcasting the second counter value, and wherein determining whether or not to allow the mobile device 120 to re-connect to the control unit 110 comprises determining, based on the value of the counter of events, to allow the mobile device 120 to re-connect to the control unit 110 if the value of the counter of events has been adjusted to the second counter value.
6. The method according to any one of example embodiments 1-5, further comprising receiving, by the control unit 110, a connection request from the mobile device 120, and wherein determining whether or not to allow the mobile device 120 to re-connect to the control unit 110 is performed by the control unit 110.

7. The method according to any one of example embodiments 1-5, wherein obtaining the indication of whether or not the second event has been generated comprises receiving the indication by the mobile device 120, wherein the indication of whether or not the second event has been generated is received in a broadcasted message from the control unit 110, and wherein determining whether or not to allow the mobile device 120 to re-connect to the control unit 110 comprises determining, by the mobile device 120, whether or not to send a connection request.

8. The method according to any of the example embodiments 1-7, wherein the release of the connection by the control unit 110 is performed in response to not being able to determine which connected mobile device out of one or more connected mobile devices 120-122 that is associated with the event.

9. The method according to any of the example embodiments 1-8, wherein the release of the connection by the control unit 110 is performed if the number of connected mobile devices is larger than a maximum number of mobile devices allowed to connect to the control unit 110 simultaneously.

10. The method according to any one of example embodiments 1-9, wherein the event generated in the access control system 100 is a result of a request given by a user of a mobile device out of one or more mobile devices 120-123.

11. The method according to any one of example embodiments 1-10, further comprising:
selecting, by the control unit 110, the radio-frequency connection between the mobile device 120 and the control unit 110 to be released by selecting a connection to be released among one or more connections between the control unit 110 and the one or more connected mobile devices 120-122 based on which connection that was established first.

12. An access control system 100 configured to perform the method according to any one of example embodiments 1-11, wherein the access control system 100 comprises a control unit 110 and a mobile device 120 which is configured to be connected to the control unit 110 using radio-frequency signal communication.

13. The access control system 100 according to example embodiment 12, wherein the mobile device 120 is any one of a mobile phone, a tablet, a laptop, a key fob, a smart watch or a smart bracelet, wherein the control unit 110 is any unit controlling access to a physical area, a logical area, a protected device, or a protected resource, and wherein the access control system 100 is configured to generate an event in response to a request from a user of a mobile device 120 requesting access to the physical area, to the content of the logical area, to the protected device or to the protected resource.

14. A computer program 603, 703, comprising computer readable code units which when executed on an access control system 100 causes the access control system 100 to perform the method according to any one of example embodiments 1-11.

15. A method, performed by a control unit 110 of an access control system 100, for handling a radio-frequency connection between the control unit 110 and a mobile device 120 of the access control system 100, the method comprising:

obtaining an indication of a first event generated in the access control system 100 in response to a first request for the control unit 110 to arrange to carry out an action;
releasing the radio-frequency connection between the mobile device 120 and the control unit 110; and
broadcasting an indication of whether or not a second event has been generated in the access control system 100 in response to a second request for the control unit 110 to arrange to carry out the action.

The method for determining whether or not to arrange to carry out the action in response to the generated event may be implemented in any access control system, e.g. the access control system 100 shown in FIG. 1*a* and/or in FIG. 1*b*, for access control of a physical area, a logical area, a protected device, or a protected resource, etc. Thus, the access control system 100 is configured to determine whether or not to arrange to carry out the action in response to the generated event. Thus, the access control system 100 is configured to perform at least the embodiments described by carrying out the corresponding method actions as described above.

The generated event may be a result of a request issued by a user, requesting the control unit 110 to arrange access to a physical area, a logical area, a protected device, or a protected resource, etc. As shown in FIG. 1*a* and in FIG. 1*b*, the access control system 110 comprises a control unit 110 and one or more connected mobile devices 120-122. As mentioned above, a respective one of the one or more connected mobile devices 120-122 may be any one of a mobile phone, a tablet, a laptop, a key fob, a smart watch or a smart bracelet.

The control unit 110 may be any unit controlling access to a physical area, a logical area, a protected device, or a protected resource.

Figure 6:
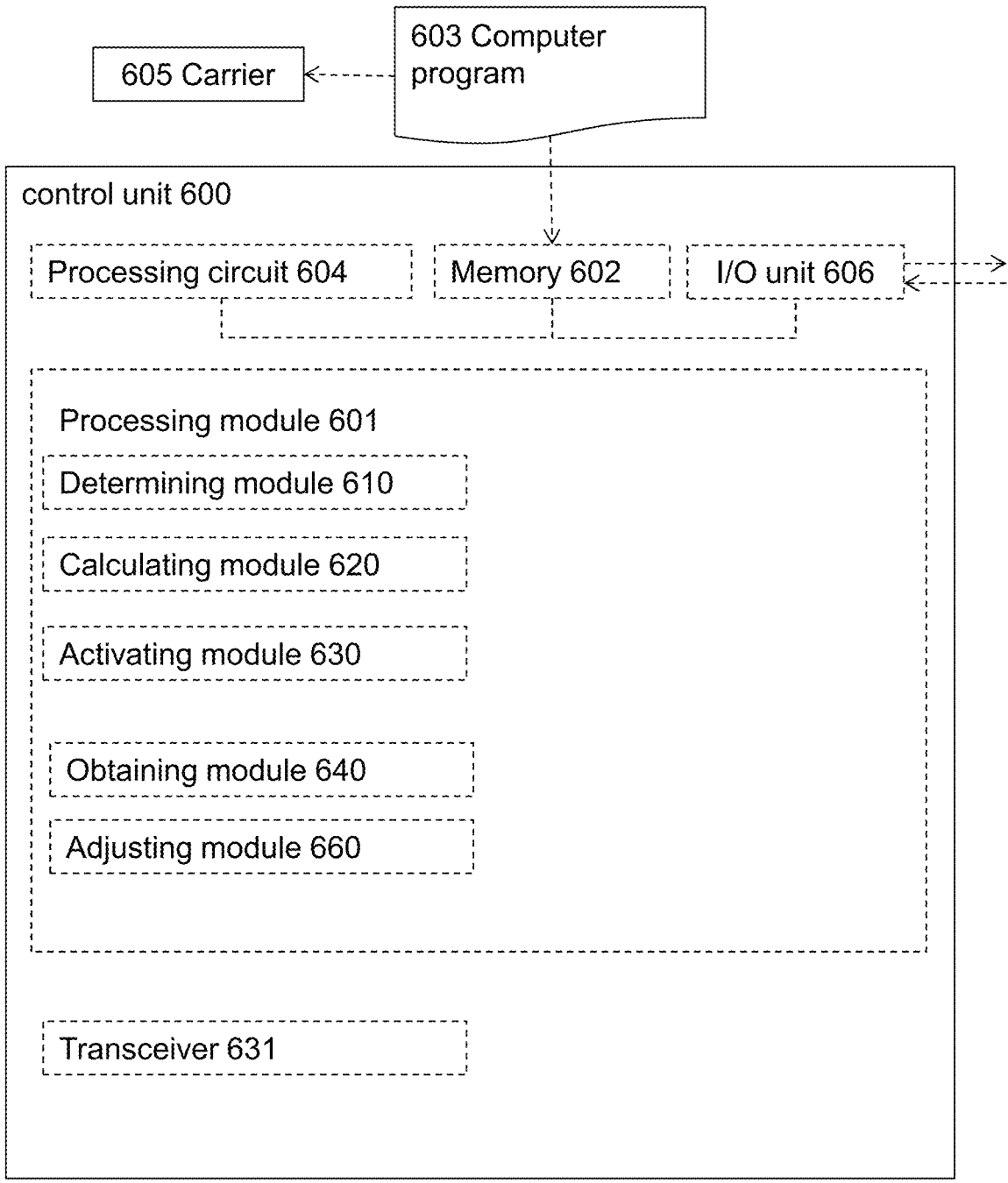
FIG. 6 is block diagram illustrating a control unit in which methods according to embodiments herein may be implemented.
Figure 7:
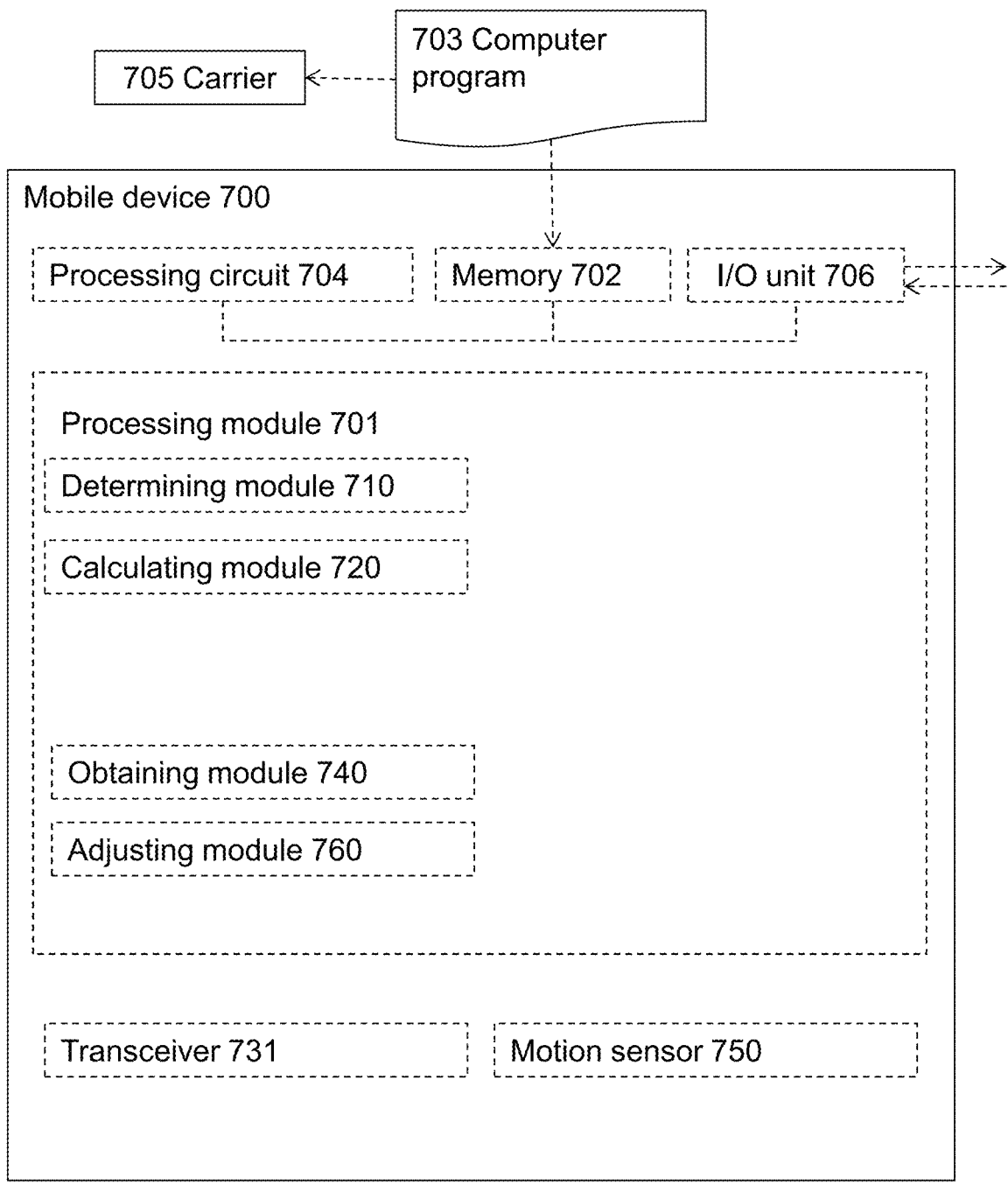
FIG. 7 is block diagram illustrating a mobile device in which methods according to embodiments herein may be implemented.

Embodiments of a control unit 600 will now be further described with reference to a schematic block diagram illustrated in FIG. 6, while embodiments of a connected mobile device 700 will be further described with reference to a schematic block diagram illustrated in FIG. 7. The control unit 600 corresponds to the control unit 110 of FIGS. 1*a* and 1*b*, while the connected mobile device 700 corresponds to the connected mobile device 120 of FIGS. 1*a* and 1*b*.

The control unit 600 and the connected mobile device 700 may each comprise a processing module 601, 701, such as a means for performing the methods described herein. The means may be embodied in the form of one or more hardware modules and/or one or more software modules The control unit 600 and the connected mobile device 700 may further each comprise a memory 602, 702. The memory may comprise, such as contain or store, instructions, e.g. in the form of a computer program 603, 703, which may comprise computer readable code units which when executed on the control unit 600 and/or the connected mobile device 700 causes the control unit 600 and/or the connected mobile device 700 to perform the methods above.

According to some embodiments herein, the control unit 600 and/or the connected mobile device 700 and/or the processing module 601,701 comprises a processing circuit 604, 704 as an exemplifying hardware module, which may comprise one or more processors. Accordingly, the processing module 601, 701 may be embodied in the form of, or 'realized by', the processing circuit 604, 704. The instructions may be executable by the processing circuit 604, 704, whereby the control unit 600 and/or the connected mobile device 700 is operative to perform the methods described above. As another example, the instructions, when executed by the control unit 600 and/or the connected mobile device 700 and/or the processing circuit 604, 704, may cause the control unit 600 and/or the connected mobile device 700 to perform the methods described above.

In view of the above, in one example, the access control system 100 comprising the control unit 600 and the connected mobile device 700, is provided for determining whether or not to arrange to carry out the action in response to the event generated in the access control system 100. Again, the memory 602, 702 contains the instructions executable by said processing circuit 604, 704 whereby the control unit 600 and/or the connected mobile device 700 is operative for performing the methods described above in relation to FIGS. 2 and 3. The methods comprise transmitting, by the radio-frequency transceiver 112, radio-frequency signals to be used for measurements of received signal strength by the one or more connected mobile devices 120-122. The method further comprises sending, by the control unit 110, a motion status request to the connected mobile device 120 out of the one or more connected mobile devices 120-122 in response to the generated event.

The method further comprises determining 204 an indication of a probability that the connected mobile device 120 is associated with the event. Determining the indication of the probability is based on received signal strength data and motion sensor data of the connected mobile device 120. The received signal strength data is measured by the connected mobile device 120 and based on the radio-frequency signals transmitted during a first predetermined period of time before the motion status request from the control unit 110 is received. The motion sensor data is collected from a motion sensor comprised in the connected mobile device 120, during a second predetermined period of time before the motion status request from the control unit 110 is received.

The method further comprises determining, by the control unit 110, whether or not to arrange to carry out the action based on the indication of the probability that the connected mobile device 120 is associated with the event.

In some embodiments, the control unit 600 and/or the connected mobile device 700 and/or the processing module 601, 701 may comprise one or more of a transceiver module 631, 731 for RF communications, a determining module 610, 710, and a calculating module 620, 720, as exemplifying hardware modules. In other examples, one or more of the aforementioned exemplifying hardware modules may be implemented as one or more software modules.

According to the various embodiments described above, the transceiver module 631 of the control unit 110, 600 is configured to transmit the radio-frequency signals to be used for measurements of received signal strength by the one or more connected mobile devices 120-122. The transceiver module 631, 731 may further be configured to transmit and/or receive the motion status request and the response to the motion status request.

According to the various embodiments described above the determining module 610, 710 is configured to determine the indication of the probability that the connected mobile device 120, 700 is associated with the event.

The determining module 610 of the control unit is further configured for determining whether or not to arrange to carry out the action based on the indication of the probability that the connected mobile device is associated with the event.

Furthermore, the calculating module 620, 720 may be configured to calculate the estimated value indicating the probability that the connected mobile device 120, 700 is associated with the event based on the received signal strength data, and further configured to calculate a correcting motion factor based on the motion sensor data, and further configured to adjust the estimated value with the correcting motion factor to obtain a corrected estimated value indicating the probability.

Moreover, the processing module 601, 701 may comprise an Input/Output unit 606, 706. According to an embodiment, the Input/Output unit 606 of the control unit 600 may comprise a command receiving unit, e.g. the request receiving unit 113.

The control unit 600 may further comprise an activating module 630 which may arrange to carry out actions requested by users of connected mobile devices 120-122. The activating module 630 may e.g. arrange to unlock the lock 111a of the door 111b in response to a request to unlock the lock 111a.

The connected mobile device 700 may further comprise a motion sensor 750 for generating motion sensor data.

The control unit 600 and/or the connected mobile device 700 and/or the processing module 601, 701 may further comprise one or more of an obtaining module 640, 740, and an adjusting module 660, 760. The obtaining module 640, 740 may obtain indications of whether or not an event has generated. The adjusting module 660, 760 may adjust the counter of events.

The determining module 610, 710 may further be configured to determine, based on the indication of whether or not the second event has been generated, whether or not to allow the mobile device 120 to re-connect to the control unit 110.

To summarise, the access control system 100 and the methods for determining whether or not to arrange to carry out the action in response to the generated event described above have several advantages, for example:

Allowing to monitor behaviors of users of connected mobile devices and arrange access for those who actually have intention to gain access and the correct access rights.

Prevent giving the access to someone un-authorized who issues a request on or at the control unit 110, 600, as well as to a user of mobile device, where the mobile device is laying close to the control unit 110, 600 with an activate connection, but where the user has not issued a request.

The requested access can be arranged in a secured way. For example, the control unit 110, 600 starts a verification process if the request is given on the control unit 110, 600 by sending a motion status request to all connected mobile devices, and based on the response, verifies if the request is given by a user of a connected mobile device with the intention, and the access rights, to get access.

Allowing to monitor many mobile devices at once and prioritizing them, thus allowing incoming users exceeding the current maximum number of connections to be connected, while inactive or just passing users are disconnected, i.e. the connections are released.

The response time of the control unit 110, 600 following a generated event is reduced. This is achieved by connecting mobile devices when they are in reach of the control unit 110, 600. If the event is the result of a request in the form of, e.g. pressing a button or touching a touch screen on or at the control unit 110, 600, and given by a user of a mobile device already connected to the control unit 110, 600, the control unit 110, 600 quickly verifies the request and arranges the requested action.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in an access control system for determining whether or not to arrange to carry out an action in response to an event generated in the access control system, wherein the access control system comprises a control unit connected to multiple mobile devices using radio-frequency signal communication, and further comprises a radio-frequency transceiver, and wherein the event indicates a request for the control unit to arrange to carry out the action, the method comprising:
   transmitting, by the radio-frequency transceiver, radio-frequency signals to be used for measurements of received signal strength by the multiple connected mobile devices;
   in response to the generated event, sending by the control unit, a motion status request to a respective connected mobile device out of the multiple connected mobile devices;
   determining, by the control unit or by the respective connected mobile device, an indication of a probability that the respective connected mobile device is associated with the event, wherein determining the indication of the probability is based on received signal strength data and motion sensor data of the respective connected mobile device, wherein the received signal strength data is measured by the respective connected mobile device and based on the radio-frequency signals transmitted during a first predetermined period of time before the motion status request from the control unit is received, and wherein the motion sensor data is collected from a motion sensor, comprised in the respective connected mobile device, during a second predetermined period of time before the motion status request from the control unit is received, wherein the motion status request functions as a trigger for the respective connected mobile device to compile received signal strength data and motion sensor data that is to be used for determining the indication of the probability that the connected mobile device is associated with the event; and
   determining, by the control unit, whether or not to arrange to carry out the action based on the indication of the probability that the respective connected mobile device is associated with the event.

2. The method according to claim 1, wherein determining whether or not to arrange to carry out the action based on the indication of the probability that the connected mobile device is associated with the event comprises:
   determining to carry out the action if the indication of the probability that the connected mobile device is associated with the event fulfils a predefined condition, or
   determining to not carry out the action if the indication of the probability that the connected mobile device is associated with the event does not fulfil the predefined condition, or if there is no response within a time limit from the connected mobile device to the motion status request.

3. The method according to claim 2, wherein it has been determined to not carry out the action, the method further comprising:
   releasing a connection between the connected mobile device, and the control unit, or
   releasing a respective connection between each of the one or more connected mobile devices and the control unit.

4. The method according to claim 1, wherein determining the indication of the probability comprises:
   calculating an estimated value indicating the probability that the connected mobile device is associated with the event based on the received signal strength data;
   calculating a correcting motion factor based on the motion sensor data; and
   adjusting the estimated value with the correcting motion factor to obtain a corrected estimated value indicating the probability.

5. The method according to claim 4, wherein determining the indication of the probability comprises comparing the corrected estimated value indicating the probability that the connected mobile device is associated with the event with a predefined threshold value corresponding to a predefined probability that the connected mobile device is associated with the event.

6. The method according to claim 4, wherein determining the indication of the probability based on the received signal strength data and motion sensor data comprises calculating, by the connected mobile device, the corrected estimated value based on the received signal strength data and motion sensor data, and the method further comprises:
   in response to the motion status request from the control unit sending, by the connected mobile device, the indication of the probability to the control unit, and/or the corrected estimated value.

7. The method according to claim 4, further comprising:
   receiving, by the control unit, the received signal strength data and motion sensor data from the connected mobile device in response to the motion status request; and
   wherein determining the indication of the probability that the connected mobile device is associated with the event based on the received signal strength and motion sensor data comprises calculating, by the control unit, the corrected estimated value based on the received signal strength data and motion sensor data.

8. The method according to claim 4, wherein the corrected estimated value corresponds to a corrected estimated time to reach the radio-frequency transceiver, and calculating the corrected estimated time comprises:
   calculating an estimated time for the mobile device to reach the radio-frequency transceiver based on the received signal strength data;
   calculating, a correcting motion factor based on the motion sensor data; and
   adjusting the estimated time by the motion factor to obtain the corrected estimated time.

9. The method according to claim 4, wherein the motion factor indicates a measure of change in motion of the mobile device.

10. The method according to claim 1, wherein the motion sensor data comprises acceleration data, and/or rotational speed data.

11. The method according to claim 1, wherein the request for the control unit to arrange to carry out the action comprises a request to grant access to a physical area, a logical area, a protected device, or a protected resource, and wherein determining whether or not to arrange to carry out an action in response to the generated event comprises determining whether or not to grant access to the physical area, the logical area, the protected device, or the protected resource.

12. The method according to claim 1, wherein the control unit sends the motion status request to multiple connected mobile devices out of the one or more connected mobile devices, and wherein determining the indication of the probability comprises determining a respective indication of a probability that a respective one of the multiple connected mobile devices is associated with the event, and wherein determining whether or not to arrange to carry out the action comprises determining whether or not to arrange to carry out the action based on the respective indication of the probability.

13. The method according to claim 1, wherein the event generated in the access control system is a result of a request given by a user of a mobile device.

14. The method according to claim 1, wherein the motion status request requests the connected mobile device to respond with the indication of the probability that the connected mobile device is associated with the event.

15. An access control system configured to perform the method according to claim 1, wherein the access control system comprises a control unit configured to be connected to multiple connected mobile devices, wherein a respective one of the multiple connected mobile devices is any one of a mobile phone, a tablet, a laptop, a key fob, a smart watch or a smart bracelet, wherein the control unit is any unit controlling access to a physical area, a logical area, a protected device, or a protected resource.

* * * * *